United States Patent
Yamamoto et al.

(10) Patent No.: US 7,481,524 B2
(45) Date of Patent: Jan. 27, 2009

(54) INK FOR INKJET RECORDING, METHOD OF INKJET RECORDING, INK CARTRIDGE AND INKJET RECORDING APPARATUS

(75) Inventors: Tomoya Yamamoto, Joso (JP); Hitoshi Inoue, Joso (JP); Yukiko Tachibana, Joso (JP); Takayuki Ookawa, Joso (JP); Junko Morioka, Joso (JP)

(73) Assignee: Canon Finetech Inc., Ibaraki (JP)

( * ) Notice: Subject to any disclaimer, the term of this patent is extended or adjusted under 35 U.S.C. 154(b) by 15 days.

(21) Appl. No.: 10/573,577

(22) PCT Filed: Oct. 20, 2004

(86) PCT No.: PCT/JP2004/015485

§ 371 (c)(1),
(2), (4) Date: Mar. 24, 2006

(87) PCT Pub. No.: WO2005/037937

PCT Pub. Date: Apr. 28, 2005

(65) Prior Publication Data

US 2007/0103525 A1    May 10, 2007

(30) Foreign Application Priority Data

Oct. 20, 2003   (JP) .............................. 2003-359333

(51) Int. Cl.
*G01D 11/00* (2006.01)
(52) U.S. Cl. ................... 347/100; 347/95; 106/31.6
(58) Field of Classification Search .......... 347/100, 347/95, 96, 101; 523/160; 106/31.6, 31.13, 106/31.27, 13.27

See application file for complete search history.

(56) References Cited

U.S. PATENT DOCUMENTS

| 5,846,306 | A | 12/1998 | Kubota et al. |
| 6,030,441 | A | 2/2000 | Kubota et al. |
| 6,075,069 | A * | 6/2000 | Takemoto ................... 523/160 |
| 7,044,592 | B2 | 5/2006 | Sato et al. |

(Continued)

FOREIGN PATENT DOCUMENTS

EP   1 371 696   12/2003

(Continued)

OTHER PUBLICATIONS

English translation of International Preliminary Report on Patentability for parent application PCT/JP2004/015485 dated Jul. 20, 2006.

(Continued)

*Primary Examiner*—Manish S Shah
(74) *Attorney, Agent, or Firm*—Fitzpatrick, Cella, Harper & Scinto

(57) ABSTRACT

In the present invention, an inkjet recording ink can be provided, which ink can record stably an image with good fastness and elegant-quality over a long period in any conditions. The ink includes a high-molecular dispersant, a water-insoluble colorant, water-soluble organic solvent and water, in which the high-molecular dispersant is a block copolymer including at least one hydrophobic block and at least one hydrophilic block, which have been obtained by polymerizing vinyl ethers as monomers, respectively; and the water-insoluble colorant is a specific pigment. Further the present invention can provide a inkjet recording method, an inkjet cartridge, and an inkjet recording system.

11 Claims, 3 Drawing Sheets

U.S. PATENT DOCUMENTS

| | | | |
|---|---|---|---|
| 2002/0135650 A1* | 9/2002 | Nagai et al. | 347/100 |
| 2002/0180854 A1 | 12/2002 | Sato et al. | |
| 2003/0050364 A1 | 3/2003 | Sato et al. | |
| 2004/0141072 A1 | 7/2004 | Nilsson et al. | |
| 2005/0209367 A1 | 9/2005 | Sato et al. | |
| 2005/0212885 A1 | 9/2005 | Kawano | |

FOREIGN PATENT DOCUMENTS

| | | |
|---|---|---|
| JP | 10-120956 | 5/1998 |
| JP | 2002-292989 | 10/2002 |
| JP | 2002-292989 A | 10/2002 |
| JP | 2002-332440 | 11/2002 |
| JP | 2003-119342 | 4/2003 |
| JP | 2003-119342 A | 4/2003 |
| JP | 2004-9679 A | 1/2004 |
| JP | 2004-35736 A | 2/2004 |
| JP | 2004-115717 A | 4/2004 |
| JP | 2004-203968 A | 7/2004 |
| JP | 2004-204112 A | 7/2004 |
| JP | 2004-210864 A | 7/2004 |
| JP | 2004-210937 A | 7/2004 |
| JP | 2004-210938 A | 7/2004 |
| JP | 2004-210939 A | 7/2004 |
| JP | 2004-210940 A | 7/2004 |
| JP | 2004-217915 A | 8/2004 |
| JP | 2004-249716 A | 9/2004 |

OTHER PUBLICATIONS

English Abstract for Japanese Patent Publication No. 2004-210940, published Jul. 29, 2004.
English Abstract for Japanese Patent Publication No. 2004-210939, published Jul. 29, 2004.
English Abstract for Japanese Patent Publication No. 2004-210938, published Jul. 29, 2004.
English Abstract for Japanese Patent Publication No. 2004-210937, published Jul. 29, 2004.
English Abstract for Japanese Patent Publication No. 2004-210864, published Jul. 29, 2004.
English Abstract for Japanese Patent Publication No. 2004-204112, published Jul. 22, 2004.
English Abstract for Japanese Patent Publication No. 2004-203968, published Jul. 22, 2004.
English Abstract for Japanese Patent Publication No. 2004-249716, published Sep. 9, 2004.
English Abstract for Japanese Patent Publication No. 2004-343685, published Jan. 15, 2004.
English Abstract for Japanese Patent Publication No. 2004-115717, published Apr. 15, 2004.
English Abstract for Japanese Patent Publication No. 2004-217915, published Aug. 5, 2004.
Supplementary European Search Report dated Oct. 6, 2006.

* cited by examiner

[Fig. 1]
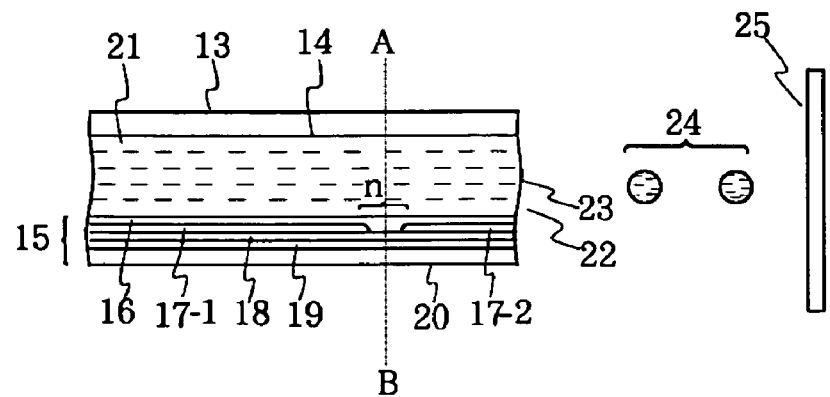
[Fig. 2]
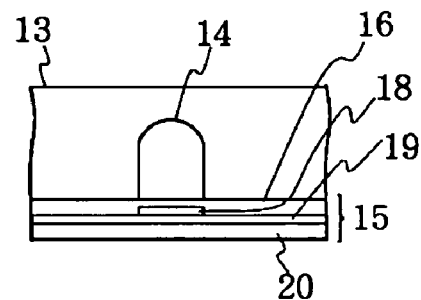
[Fig. 3]
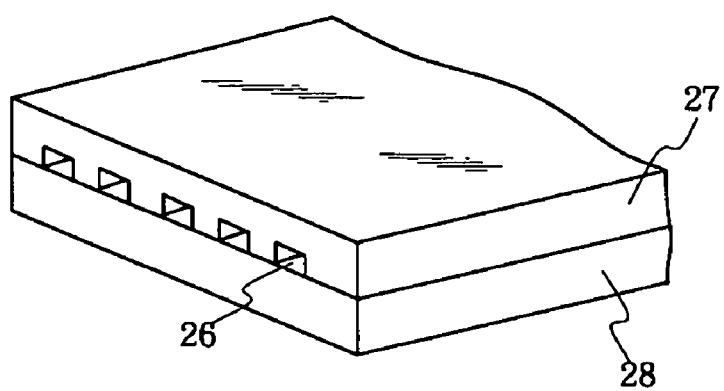

[Fig. 4]
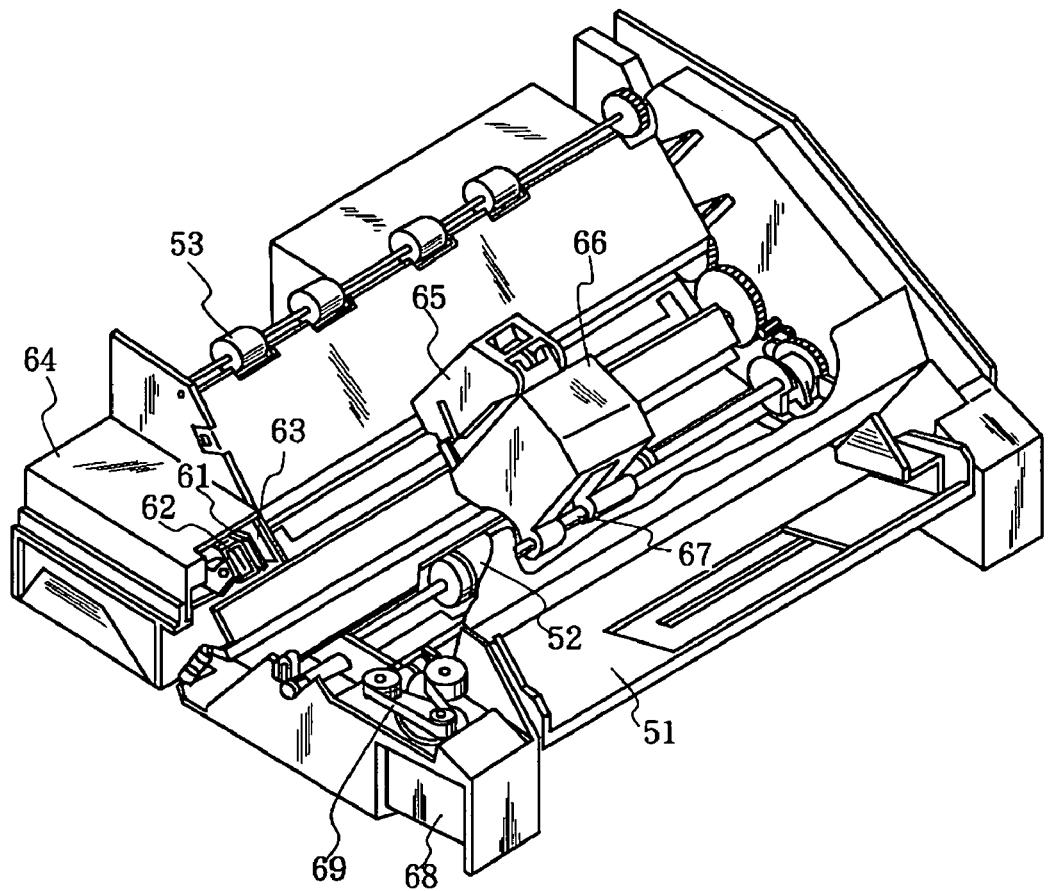
[Fig. 5]
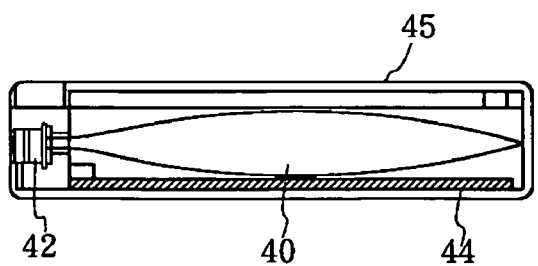

[Fig. 6]
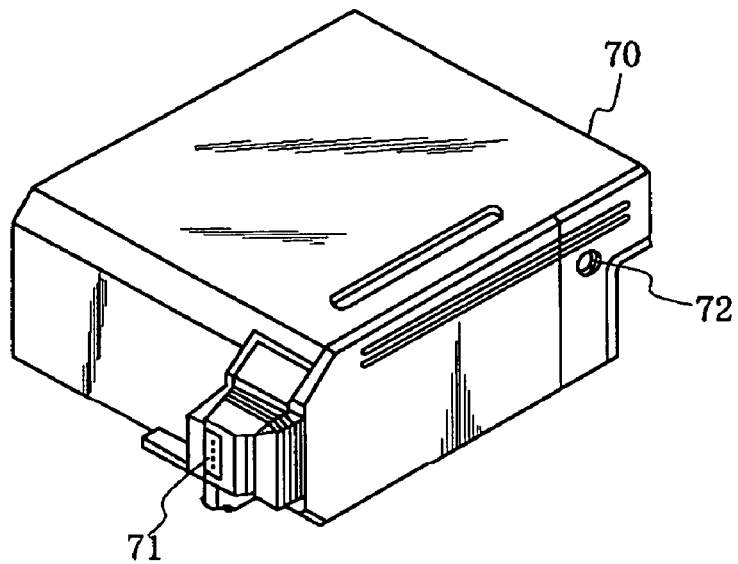
[Fig. 7]
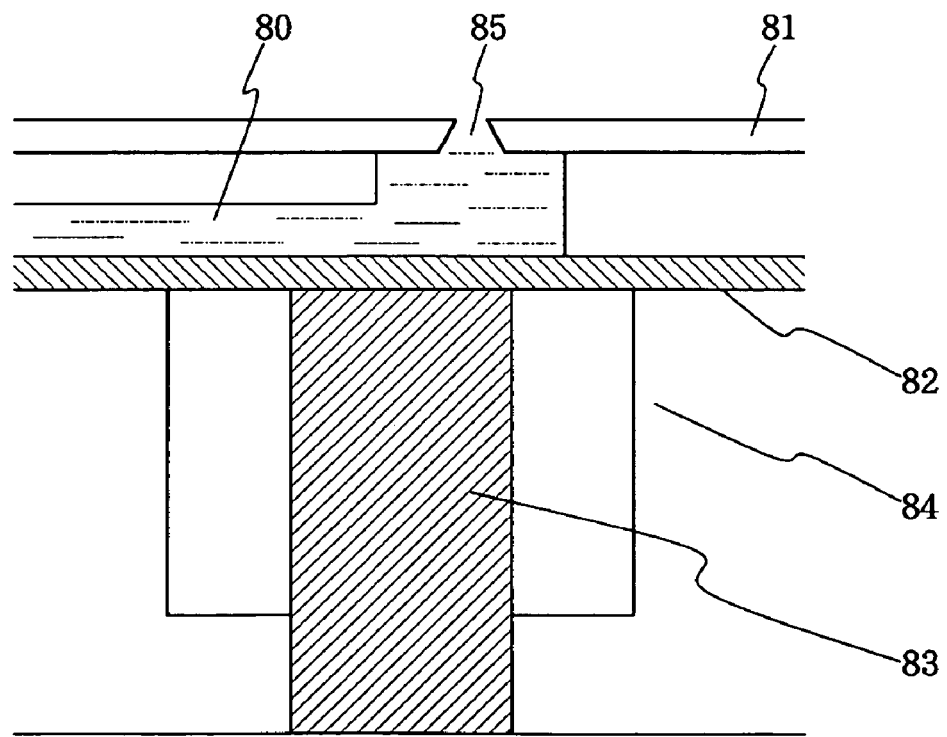

INK FOR INKJET RECORDING, METHOD OF INKJET RECORDING, INK CARTRIDGE AND INKJET RECORDING APPARATUS

TECHNICAL FIELD

This invention is related to an inkjet recording ink (hereinafter simply called "ink"), an inkjet recording method, an ink cartridge and an inkjet recording system. More specifically, the present invention relates to a water-based ink of the colorant dispersion type having high ejection reliability, permitting formation of images of good characteristics and suited for inkjet recording and is also concerned with an inkjet recording method, ink cartridge and inkjet recording system all of which make use of the ink.

BACKGROUND ART

As colorants for printing inks, water-insoluble colorants excellent in fastness such as waterproofness and light fastness, for example, pigments have been used widely to date. To use a water-insoluble colorant as a colorant for a water-based ink, it is required to stably disperse the water-insoluble colorant in an aqueous medium. Water-based inks of the colorant dispersion type are hence used, each of which contains a water-insoluble colorant evenly dispersed in an aqueous medium by the addition of a dispersant such as a high-molecular compound or surfactant.

In recent years, water-based inks of such colorant dispersion type have also been used in inkjet recording from the standpoint of image fastness. In the inkjet recording, it is attempted to provide colorant dispersion particles, which are dispersed in an ink, with agglomerating property and water-insolubility so that the ink can exhibit improved fixing property and waterproofness on paper. The provision of such properties to the colorant particles, however, leads to a reduction in the dispersion stability of the colorant particles in the ink, thereby developing potential problems such that the colorant particles may easily agglomerate and settle during storage of the ink; the resulting images tend to exhibit uneven print density; and clogging attributable to drying of the ink tends to occur at nozzle tips of an inkjet recording system to result in reduced ejection stability.

In an attempt to solve the above-mentioned problems, an ink which contains water-insoluble colorant having a specific structure is proposed in the bellow Patent Reference 1. In this ink, however, only water-insoluble property of the colorant as a colorant has been considered; the ink has some effect on an imaging property formed with the ink, but it has great problems in its long-term storage stability and its ejection stability.

An ink also is proposed in the bellow Patent Reference 2, which ink contains a high-molecular dispersant having a specific structure in a hydrophobic segment in its high-molecular structure. In this high-molecular dispersant, its hydrophilic segments closely associated with the compatibility with ink medium are not taken into account; consequently the ink has such problems that the dispersion stability of the colorant particles are significantly lowered during its storage with long-term or high-temperature. Because of such problems, specifically the dispersion stability of the ink are significantly reduced when an ink composition are extremely changed in response to concentration of the ink at nozzle tips of a recording head, which concentration inevitably are caused on use of an ink in an inkjet system; the lowered dispersion stability of an ink, thereby, leads the reduced ejection stability of the ink. Further the ink has such problems that, upon use of the ink in an inkjet recording system applying thermal energy to the ink to cause the ink to fly onto a recording medium, the colorant particles agglomerate extremely because of the generation of heat; the agglomeration makes ejection of the ink impossible.

Patent Reference 1: JP 1998-120956 A
Patent Reference 2: JP 2002-332440 A

DISCLOSURE OF THE INVENTION

Problems to be Solved by the Invention

With the foregoing problems in view, the present invention, therefore, has as objects thereof the provision of an ink capable of stably recording images of high fastness and excellent quality over a long period even under any conditions and also the provision of an inkjet recording method, ink cartridge containing such an ink and inkjet recording system all of which make it possible to record images of superb fastness and quality.

Means for Solving the Problems

The present inventors have proceeded with an extensive investigation to solve the above-described problems. As a result, it has been found that the problems can be solved by the invention to be described hereinafter: The present invention provides an inkjet recording ink comprising a high-molecular dispersant, a water-insoluble colorant, a water-soluble organic solvent, and water, characterized in that the high-molecular dispersant comprises at least a hydrophobic block and at least a hydrophilic block, each block being a block copolymer containing a vinyl ether as a monomer; the water-insoluble colorant is at least one colorant selected from the group consisting of C.I. Pigment Yellow 3, C.I. Pigment Yellow 74, C.I. Pigment Yellow 93, C.I. Pigment Yellow 95, C.I. Pigment Yellow 109, C.I. Pigment Yellow 120, C.I. Pigment Yellow 128, C.I. Pigment Yellow 138, C.I. Pigment Yellow 151, C.I. Pigment Yellow 175, C.I. Pigment Yellow 183 and C.I. Pigment Yellow 184, at least one colorant selected from the group consisting of C.I. Pigment Black 1, C.I. Pigment Black 7, C.I. Pigment Black 10, C.I. Pigment Black 31 and C.I. Pigment Black 32, at least one colorant selected from the group consisting of C.I. Pigment Red 12, C.I. Pigment Red 122, C.I. Pigment Red 184, C.I. Pigment Red 202, C.I. Pigment Violet 19 and C.I. Pigment Violet 32, or at least one colorant selected from the group consisting of C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16 and C.I. Pigment Green 7.

The ink of the above present invention is preferable to contain in addition at least one compound selected from the group consisting of a calcium compound and magnesium compound, with a weight ratio of a sum (A) of the calcium compound and magnesium compound to the high-molecular dispersant (B), namely A:B ranging from 1:50,000 to 1:200; and further still to contain an aluminum compound.

In the above-described ink, it is preferred that the hydrophilic block in the high-molecular dispersant is formed of an anionic vinyl ether; that the hydrophilic block in the high-molecular dispersant is formed of a nonionic vinyl ether; that the hydrophilic block in the high-molecular dispersant is composed of at least one block formed of a nonionic vinyl ether and at least one block formed of an anionic vinyl ether; and that the high-molecular dispersant is composed of at least one block formed of a hydrophobic vinyl ether, at least one block formed of a nonionic hydrophilic vinyl ether and at least one block formed of an anionic hydrophilic vinyl ether, preferably at least in this order.

The present invention also provides an inkjet recording method, which is conducted by applying energy to an ink to cause the ink to fly onto a recording medium, characterized in that the ink is any one of the above-described inks according to the present invention. As the energy, thermal energy is preferred, and the recording medium may preferably have an ink-receiving coating layer on at least one of opposite sides thereof.

The present invention also provides an ink cartridge provided with an ink reservoir with an ink stored therein, characterized in that the ink is any one of the above-described inks according to the present invention. The present invention further provides an inkjet recording system provided with an ink cartridge, which is provided with an ink reservoir with an ink stored therein, and also with a recording head portion for ejecting the ink, characterized in that the ink is any one of the above-described inks according to the present invention.

According to the present invention, it is possible to provide with an ink capable of stably recording images of high fastness and excellent quality over a long period even under any conditions and also with an inkjet recording method, ink cartridge containing such an ink and inkjet recording system all of which make it possible to record images of superb fastness and quality.

BEST MODES FOR CARRYING OUT THE INVENTION

The present invention will hereinafter be described in detail.

The present inventors have found that in an inkjet recording ink comprising a high-molecular dispersant, a water-insoluble colorant, a water-soluble organic solvent and water, inkjet-recording images of high fastness and excellent quality are capable of being stably recorded under any conditions by the use of a block copolymer having at least one hydrophobic block and at least one hydrophilic block in the ink as the high-molecular dispersant, each block comprising a vinyl ether as a monomer, and the inclusion of, as a water-insoluble colorant in the ink, at least one colorant selected from the group consisting of C.I. Pigment Yellow 3, C.I. Pigment Yellow 74, C.I. Pigment Yellow 93, C.I. Pigment Yellow 95, C.I. Pigment Yellow 109, C.I. Pigment Yellow 120, C.I. Pigment Yellow 128, C.I. Pigment Yellow 138, C.I. Pigment Yellow 151, C.I. Pigment Yellow 175, C.I. Pigment Yellow 183 and C.I. Pigment Yellow 184; at least one colorant selected from the group consisting of C.I. Pigment Black 1, C.I. Pigment Black 7, C.I. Pigment Black 10, C.I. Pigment Black 31 and C.I. Pigment Black 32; at least one colorant selected from the group consisting of C.I. Pigment Red 12, C.I. Pigment Red 122, C.I. Pigment Red 184, C.I. Pigment Red 202, C.I. Pigment Violet 19 and C.I. Pigment Violet 32; or at least one colorant selected from the group consisting of C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16 and C.I. Pigment Green 7.

The above stable recording can be attributed primarily to the use of the block copolymer comprising at least one hydrophobic block and at least one hydrophilic block as the high-molecular dispersant. Such hydrophobic blocks can evenly adhere to the surfaces of particles of the colorant so that the high-molecular dispersant evenly covers, in other words, encapsulates the colorant particles without their exposure to the air. As each hydrophobic block is in the form of a polyvinyl ether obtained by polymerizing a vinyl ether as a monomer and containing many ether structures, it is considered that electrostatic interactions occur between ether portions in the hydrophobic block(s) of each high-molecular dispersant molecule and ether portions in hydrophobic blocks of adjacent high-molecular dispersant molecules, in other words, physical bonds are formed between hydrophobic blocks in molecules of the high-molecular dispersant; and such physical bonds lead to improved stability of the encapsulated colorant particles. Owing to this improvement, even in printed images after recording, the stable capsules may be maintained and then the colorant particles may be also protected by the high-molecular dispersant; because of this protection, the colorant is considered to exhibit excellent fastness as compared with that in such a case that colorant particles are exposed at parts thereof to the air.

In addition, as the hydrophilic portion(s) of the high-molecular dispersant is in the form of block(s), the high-molecular dispersant has more excellent compatibility in an ink medium, so that, as compared with one making use of a high-molecular dispersant subjected to random polymerization of hydrophobic group(s) and hydrophilic group(s), the colorant particles may be significantly improved in the dispersion stability; these improvements are considered to render the colorant particles far less susceptible to agglomeration and settling and therefore, to bring about improvements in the dispersion stability of the colorant particles during long-term storage. The hydrophilic block, like the hydrophobic block, is in the form of a polyvinyl ether obtained by polymerizing a vinyl ether as a monomer and contains many ether structures. It is considered that such ether structures appropriately enhance interactions among the hydrophilic blocks forming the outside-configuration of an encapsulated colorant (hereinafter, simply called "capsule" in some instances.); the interaction causes the outside-configuration of the capsule to make stable and maintain the whole capsule in uniform. Owing to this, even when the form of the capsule is changeable upon heating, disturbed charge scarcely occurs at a surface of the capsule; the charge can be maintained in uniform density. As a result, agglomeration or association between capsules caused by an electric factor may decrease significantly. This decrease may result in the enhanced dispersion stability of colorant particles in an inkjet printing ink with the high-temperature or long-term storage; even upon the ink ejection on inkjet recording causing ink to fly on a recording medium by using thermal energy in which upon such use, the dispersed colorant particles tend to become unstable, the capsule is understood to be maintained stably; the stable capsule can enhance stable inkjet ejection.

As a still further problem upon using in an inkjet recording system an ink with dispersed colorant particles contained therein, the present inventors have also conducted an extensive investigation on such a problem that the dispersion stability of the colorant particles may be extremely lowered to result in nozzle clogging when the water in the ink evaporates at nozzle tips of a recording head and the ink is thus concentrated there; they have found that the compatibility of the hydrophobic block(s) in the high-molecular dispersant with the colorant can be improved by using the above colorant. As a result, the improved compatibility makes it possible to cause an inkjet printer to eject out an ink in the course of printing even in the use of the ink with long-term storage without nozzle clogging, which printer features substantial evaporation of water from the ink.

The constituent materials will be described hereinafter in detail in the inkjet printing ink according to the present invention.

(Water Insoluble Colorant)

The water-insoluble colorant usable in the ink according to the present invention is, in a yellow ink, at least one colorant selected from the group consisting of C.I. Pigment Yellow 3, C.I. Pigment Yellow 74, C.I. Pigment Yellow 93, C.I. Pigment Yellow 95, C.I. Pigment Yellow 109, C.I. Pigment Yellow 120, C.I. Pigment Yellow 128, C.I. Pigment Yellow 138, C.I. Pigment Yellow 151, C.I. Pigment Yellow 175, C.I. Pigment Yellow 183 and C.I. Pigment Yellow 184; in a black ink, at least one colorant selected from the group consisting of C.I. Pigment Black 1, C.I. Pigment Black 7, C.I. Pigment Black 10, C.I. Pigment Black 31 and C.I. Pigment Black 32; in a magenta ink, at least one colorant selected from the group consisting of C.I. Pigment Red 12, C.I. Pigment Red 122, C.I. Pigment Red 184, C.I. Pigment Red 202, C.I. Pigment Violet 19 and C.I. Pigment Violet 32; or in a cyan ink, at least one colorant selected from the group consisting of C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16 and C.I. Pigment Green 7. These water-insoluble colorants can be used, in addition of using singly, in combination with two colorants or more, or in combination with other colorants not described above.

The content of the water-insoluble colorant in the ink may be preferably from 0.1 to 20 wt. %, more preferably from 1.0 to 10 wt. % based on the whole weight of the ink. In case of providing with an image by using colorant content lower than 0.1 wt. %, sufficient image density may not be obtained in some instances; while a colorant content higher than 20 wt. % may lead to a reduction in ink ejection stability due to clogging or the like at nozzles in some instances. In addition, the content ratio of the water-insoluble colorant (A) to the above high-molecular dispersant (B) in the ink, that is, A:B may be preferably in a range of 100:1 to 1:2 based on the solid weight ratio, more preferably in a range of 10:1 to 1:2; this range are preferable for ink ejection stability and ink storage stability.

The average particle size of colorant dispersion particles which the water-insoluble colorant forms with the high-molecular dispersant in the ink may be preferably 200 nm or smaller, more preferably 100 nm or smaller. This average particle size leads to a further improvement in ejection stability, and also to printed images of better color-developing property. Examples of a method for measuring the particle size of the colorant dispersion particles include laser light scattering, X-ray small-angle scattering, settling, and direct electron microscopic observation.

(High-molecular Dispersant)

The high-molecular dispersant usable in the ink according to the present invention is a block copolymer comprising at least one hydrophilic block and at least one hydrophobic block, each block being formed of vinyl ethers. The dispersants containing one or more hydrophobic blocks and two or more hydrophilic blocks, or the ones containing two or more hydrophobic blocks and one or more hydrophilic blocks can also be used. These two or more hydrophilic blocks and/or these two or more hydrophobic blocks may be of the same type or of different types. As the block copolymer, a single block copolymer or a blend of two or more block copolymers can be used. The structure of each copolymer can be linear, graft or the like, although a linear block copolymer is preferred.

As these polymer, a block having a recurring unit structure represented by the following formula (1) is preferred:

—(CH$_2$—CH(OR$^1$))—      (1)

In the above-described formula (1), R$^1$ represents an aliphatic hydrocarbon group such as an alkyl, alkenyl, cycloalkyl or cycloalkenyl group; or an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group.

One or more of the hydrogen atoms on the aromatic ring may be substituted by hydrocarbon groups. The carbon number of R$^1$ may preferably range from 1 to 18.

R$^1$ can also be a group represented by —(CH(R$^2$)—CH(R$^3$)—O)$_p$—R$^4$ or —(CH$_2$)$_m$—(O)$_n$—R$^4$. In this case, R$^2$ and R$^3$ each independently represents a hydrogen atom or a methyl group, and R$^4$ represents an aliphatic hydrocarbon group such as an alkyl, alkenyl, cycloalkyl or cycloalkenyl group, an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group, with one or more hydrogen atoms on the aromatic ring being optionally substituted by hydrocarbon groups, —CHO, —CH$_2$CHO, —CO—CH=CH$_2$, —CO—C(CH$_3$)=CH$_2$, —CH$_2$—CH=CH$_2$, —CH$_2$—C(CH$_3$)=CH$_2$, —CH$_2$—COOR$^5$. In each of these groups, one or more hydrogen atoms may be substituted by halogen atoms such as fluorine, chlorine or bromine atoms to chemically feasible extent. The carbon number of R$^4$ may preferably range from 1 to 18. R$^5$ represents a hydrogen atom or an alkyl group. Preferably, p can range from 1 to 18, m can range from 1 to 36, and n can be 0 or 1.

In R$^1$ and R$^4$, examples of the alkyl and alkenyl groups can include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, and oleyl, and examples of the cycloalkyl and cycloalkenyl groups can include cyclopropyl, cyclobutyl, cyclopentyl, cyclohexyl, and cyclooctyl.

Structures of the above-described monomers (I-a to I-o) and block copolymers (II-a to II-e) composed of the monomers will be exemplified below, although the structures of block copolymers usable in the present invention are not limited to them.

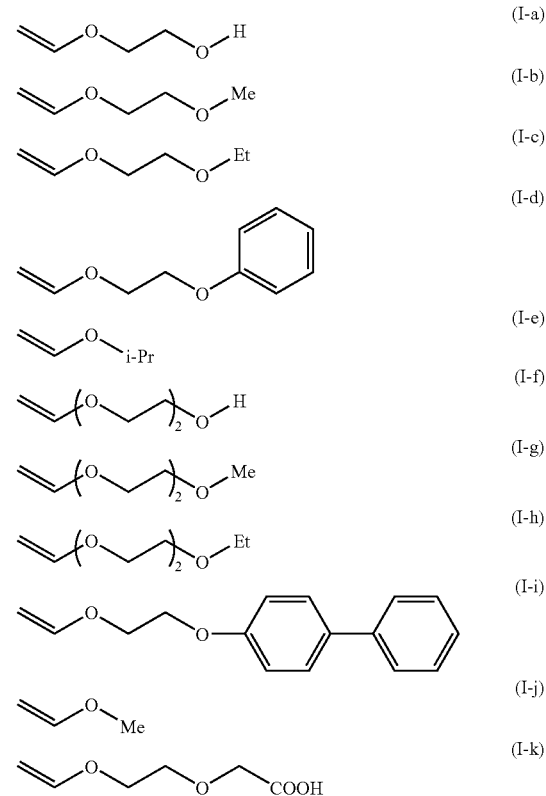

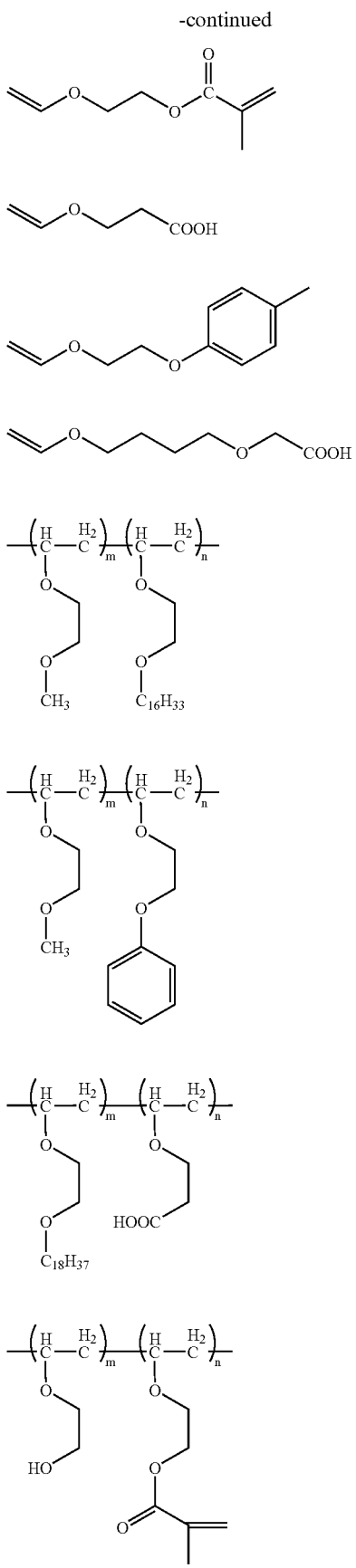

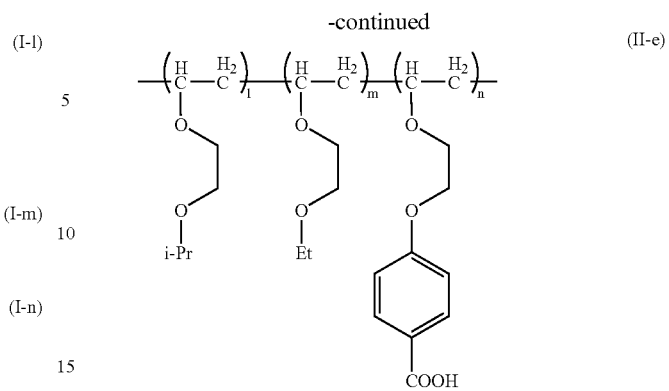

The preferred numbers of the respective recurring units in the block copolymers (i.e., m, n and l in the above-exemplified recurring units (II-a) to (II-e)) may each independently range from 1 to 10,000. More preferably, their total (i.e., m+n+l in the above-exemplified recurring units (II-a) to (II-e)) may range from 10 to 20,000. The number average molecular weight may range preferably from 500 to 20,000, more preferably from 1,000 to 5,000,000, most preferably from 2,000 to 2,000,000. The proportion of such a high-molecular dispersant in an ink may be preferably from 0.1 to 20 wt. %, more preferably from 0.5 to 10 wt. % based on the whole weight of the ink.

No particular limitation is imposed on the process for the synthesis of each copolymer (high-molecular dispersant) containing vinyl-ether-based polymer blocks, but the cation living polymerization developed by Aoshima, et al. (JP-A-11-322942, JP-A-11-322866) or the like can be suitably used. The use of the cation living polymerization process makes it possible to synthesize a variety of polymers, such as homopolymers, copolymers of two or more monomer components, block copolymers, graft copolymers and gradation copolymers, with their lengths (molecular weights) being each controlled precisely at the same value. Moreover, polyvinyl ethers allow to introduce various functional groups in their side chains.

(Water-soluble Organic Solvent)

As the water-soluble organic solvent in the ink for use in the present invention, any organic solvent can be used insofar as it is soluble in water. Two or more water-soluble organic solvents can be used in combination as a mixed solvent. When employed as such a mixed solvent, a solid, water-soluble organic compound may be contained insofar as the mixed solvent is liquid.

Among such water-soluble organic solvents, those having solubility parameters in a range of from 0.0 to +10.0 $(J/cm^3)^{1/2}$ relative to the solubility parameter of hydrophilic block units in the high-molecular dispersant are preferred because they render inkjet heads less susceptible to nozzle blocking. This solubility parameter ($\delta(J/cm^3)^{1/2}$) is expressed as the square root of the cohesive energy density of each solvent, and is a value which is calculated in accordance with the formula, $\delta=(\Delta E/V)^{1/2}$ wherein $\Delta E$ represents the molar heat of evaporation of the solvent and V represents the molar volume of the solvent, and which is a value inherent to the solvent and indicative of the solubility of the solvent. For example, $\delta=47.0$ in the case of water; $\delta=25.7$ in the case of ethanol; and $\delta=14.9$ in the case of hexane. On the other hand, the solubility parameter ($\delta$) of the high-molecular dispersant is a value empirically calculated under the assumption that the solubility parameter of a solvent capable of providing the high-molecular dispersant with the infinite solubility or the maximum degree of swelling is equal to the solubility parameter of the high-molecular dispersant. As the solubility parameters of the high-molecular dispersant and water-soluble organic solvent in the present invention, values calculated from the molecular cohesion energies of the functional groups in the high-molecular dispersant and water-soluble organic solvent are used. As a method for calculating the solubility parameters ($\delta$) of the high-molecular dispersant and water-soluble organic solvent from the molecular cohesion energies of their functional groups, calculations can each be made in accordance with the following formula: $\delta=(\Delta E/V)^{1/2}=(\Sigma\Delta e_i/\Sigma\Delta v_i)^{1/2}$ wherein $\Delta E$ represents the molar heat of evaporation, V represents the molar volume, $\Delta e_i$ represents the energy of evaporation of the atomic group (J/mol), and $\Delta v_i$ represents the molar volume of the atomic group (cm$^3$/mol). Incidentally, the energy of evaporation of each atomic group and the molar volume of each atomic group were calculated using the Fedors constants.

Examples of such water-soluble organic solvents can include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol, and 1,4-cyclohexanediol; triols such as glycerin, 1,2,4-butanetriol, 1,2,6-hexanetriol, 1,2,5-pentanetriol; hindered alcohols such as trimethylolpropane, trimethylolethane, neopentylglycol and pentaerythritol; glycol ethers such as ethylene glycol monomethyl ether, ethylene glycol monoethyl ether, ethylene glycol monoisoproyl ether, ethylene glycol monoallyl ether, diethylene glycol monomethyl ether, diethylene glycol monoethyl ether, diethylene glycol monobutyl ether, triethylene glycol monomethyl ether, triethylene glycol monoethyl ether, propylene glycol monomethyl ether and dipropylene glycol monomethyl ether; dimethylsulfoxide; glycerin monoaryl ether; polyethylene glycol; N-methyl-2-pyrrolidone; 2-pyrrolidone; $\gamma$-butyrolactone; 1,3-dimethyl-2-imidazolidinone; sulfolane; $\beta$-dihydroxyethylurea; urea; acetonylacetone; dimethylformamide; dimethylacetamide; acetone; diacetone alcohol; tetrahydrofuran; and dioxane.

Among these, water-soluble organic solvents the boiling points of which are 120° C. or higher are preferred because their use can inhibit ink concentration at nozzle tips. The proportion of such a water-soluble organic solvent in the ink may range preferably from 5 to 50 wt. %, more preferably from 10 to 30 wt. % based on the whole weight of the ink.

The foregoing are the requested constituents of the water-based ink for use in the present invention. In addition to these constituents, a variety of additives can be incorporated including surfactants, pH adjusters, antioxidants and antimolds. Among those, at least one compound selected from the group consisting of a calcium compound and a magnesium compound can be preferably included into the ink; the inclusion of such a compound(s) in an ink can serves to improve the long-term storage stability or ejection stability of the ink. This can be interpreted as follows: the interaction among the hydrophilic blocks can be enhanced by a bridging effect yielded by the action of calcium ions or magnesium ions having bivalent positive charges to ether groups forming the hydrophilic block having negative charges; this enhanced interaction may lead to the stabilization of the outside-configuration formed with the hydrophilic blocks at the surface of an encapsulated particles of the colorant. Even in those cases where the capsules tend to become unstable in those outside-configuration on heating the ink, the whole capsule can be maintained in uniform through the above stabilization; without disturbed charge on the surface of the capsule, the surface of the capsule can be maintained in uniform density of charge. As a consequence, the agglomeration or association among capsules can be in large degree suppressed.

As the content of the above calcium compound or magnesium compound in an inkjet recording ink, a weight ratio of a sum (A) of the calcium compound and magnesium compound to the high-molecular dispersant (B), namely A:B may be preferably in the range of from 1:100,000 to 1:100, more preferably in a range of from 1:50,000 to 1:200; this range leads to an improved storage stability of the ink. If the content of the calcium compound and magnesium compound is smaller than the ratio of 1:100,000, an improving effect on the storage stability of a colorant dispersion may be rendered less; if it is larger than the ratio of 1:100, nozzle clogging of the ink may tend to occur. Preferable examples of the calcium compound and magnesium compound usable for the ink according to the present invention can include calcium chloride, magnesium chloride, calcium nitrate, magnesium nitrate, calcium sulfate, magnesium sulfate, calcium hydroxide, magnesium hydroxide, calcium oxide, magnesium oxide and the like.

In addition, the inclusion of an aluminium compound in an inkjet printing ink is preferable; it can stimulate the action of the aluminium compound to the hydrophobic blocks and hydrophilic blocks of the high-molecular dispersant; the action can promote an association between the high-molecular dispersants; as a result, the high-molecular dispersant capsules may be more stabilized. This can be interpreted: like the instances of the above calcium compound or magnesium compound, by the action of the aluminium compound having positive charges on its surface to the ether groups having negative charges such as hydrophobic blocks or hydrophilic blocks, the interaction between the hydrophobic blocks or the hydrophilic blocks may be appropriately improved; and the stability of the capsule may be enhanced. Use of such an aluminium compound in combination with the calcium compound or magnesium compound can bring about still more preferable effect on the stabilized capsule.

As the content of this aluminum compound in an inkjet recording ink, a molar ratio of the aluminium compound (A) to the high-molecular dispersant (B), A:B may be preferably in the range of from 1:3,000 to 5:1, more preferably in a range of from 1:300 to 1:20; this range leads to an improved storage stability of the ink. If the content of the aluminium compound is smaller than the ratio of 1:3,000, an improving effect on a stabilized capsule may be rendered less; if it is larger than the ratio of 5:1, nozzle clogging of the ink may occur in some instances also. Preferable examples of aluminium compounds for adding in an ink can include aluminium chloride, aluminium nitrate, aluminium sulfate, aluminium hydroxide, aluminium oxide and the like.

The inkjet recording method according to the present invention is characterized in that in conducting inkjet recording by applying energy to an ink to cause the ink to fly, the above-described ink is used. Thermal energy or mechanical energy can be used as the energy, although use of thermal energy is preferred.

No particular limitation is imposed on a recording medium for use in the inkjet recording method according to the present invention. Nonetheless, a recording medium provided on at least one side thereof with an ink-receiving coating layer, which is commonly called "exclusive inkjet paper", or a like recording medium can be used preferably. Desired is, for example, a recording medium provided on at least one side thereof with an ink-receiving coating layer which contains at least a hydrophilic polymer and/or an inorganic porous material.

A description will hereinafter be made of one embodiment of the inkjet recording system according to the present invention, which is suited for use in performing recording with the above-described ink of the present invention.

(Inkjet Recording System Making Use of Thermal Energy)

Illustrated in FIGS. 1 and 2 is a recording head as a principal unit in the inkjet recording system making use of thermal energy. FIG. 1 is a fragmentary vertical cross-sectional view of the recording head 13 as taken along an ink channel, and FIG. 2 is a fragmentary transverse cross-sectional view of the recording head 13 as taken along line A-B of FIG. 1. The recording head 13 has been obtained by bonding a glass, ceramic, silicon or plastic plate, which is provided with an ink channel (nozzle) 14 to feed an ink therethrough, with a heating element plate 15. The heating element plate 15 is composed of a protective layer 16 formed of silicon oxide, silicon nitride or silicon carbide, electrodes 17-1, 17-2 formed of aluminum, gold, an aluminum-copper alloy or the like, a heating resistor layer 18 formed of a high melting-point material such as $HfB_2$, TaN, TaAl or the like, a heat storage layer 19 formed of thermal silicon dioxide, aluminum oxide or the like, and a substrate 20 formed of a material having high heat-dissipating property such as silicon, aluminum or aluminum nitride.

When pulse-like electrical signals are applied across the electrodes 17-1 and 17-2 of the recording head 13, the heating element plate 15 is promptly caused to produce heat at a region indicated by "n" so that bubbles rise in an ink 21 which is in contact with a surface of the region. Under a pressure of the bubbles, a meniscus 23 is formed. As a result, the ink 21 is ejected through the nozzle 14 of the recording head 13, and from an ejection orifice 22, the ink 21 is caused to fly as ink droplets 24 toward a recording medium 25. Depicted in FIG. 3 is an external appearance of a part of a multiple-nozzle recording head formed by arranging side by side a multiplicity of recording heads as shown in FIG. 1. This multiple-head recording head has been fabricated by bonding a glass plate 27, which is provided with a multiplicity of nozzles 26, with a similar heating head 28 as in FIG. 1.

FIG. 4 shows an illustrative inkjet recording system with the multiple-head recording head assembled therein. In FIG. 4, designated at numeral 61 is a blade as a wiping member, which is held and fixed at an end thereof by a blade holding member so that the blade takes the form of a cantilever. The blade 61 is arranged at a position adjacent to a record area by a recording head 65. In the illustrated embodiment, the blade 61 is held in such a way as protruding in a travel path of the recording head 65.

Numeral 62 indicates a cap for ink-ejecting orifices of the recording head 65. The cap 62 is arranged at a home position adjacent to the blade 61, and is movable in a direction perpendicular to a moving direction of the recording head 65 such that it is brought into contact with an orifice plate, in which the ink-ejecting orifices are defined, to perform capping. Further, numeral 63 is an ink absorber pad arranged in the neighborhood of the blade 61, and like the blade 61, the ink absorber pad 63 is held in such a way as protruding in the travel path of the recording head 65. The blade 61, cap 62 and ink absorber pad 63 make up a service station 64, and by the blade 61 and ink absorber pad 63, water, dust and the like are removed from the orifice plate in which the ink-ejecting orifices are defined.

The recording head 65 has an ejection energy producing means for ejecting an ink against a recording medium positioned opposite the orifice plate, in which the ink-ejecting orifices are defined, to perform recording. Designated at numeral 66 is a carriage on which the recording head 65 is mounted for movements. The carriage 66 is maintained in slidable engagement with a guide rod 67, and is connected at a part thereof with a drive belt 69 driven by a motor 68 although the connection itself is not shown in the drawing. The carriage 66 is, therefore, movable along the guide rod 67 so that the recording head 65 is allowed to move over the record areas and its adjacent areas.

Numeral 51 indicates a paper feed section into which recording media can be inserted, while numeral 52 designates paper feed rollers driven by an unillustrated motor. By these members, a recording medium is fed to a position located opposite the orifice plate of the recording head 65. As recording proceeds, the recording medium is progressively ejected to a paper eject section in which paper eject rollers 53 are arranged. When the recording head 65 returns to its home position subsequent to completion of recording in the above-described construction, the cap 62 of the service station 64 is shunted from the travel path of the recording head 65 but the blade 61 protrudes in the travel path. As a result, the ink-ejecting orifices of the recording head 65 are wiped.

Upon bringing the cap 62 into contact with the orifice plate of the recording head 65 to perform capping, the cap 62 is moved to protrude into the travel path of the recording head 65. When the recording head 65 moves from its home position to a record starting position, the cap 62 and the blade 61 are located at the same positions as the above-described positions where they were located at the time of the wiping. As a consequence, the orifice plate of the recording head 65 is also wiped in this movement. The above-mentioned movement of the recording head to its home position takes place upon completion of recording and upon restoration of ejection. While the recording head is moving over the record area to perform recording, the recording head 65 is caused to move at predetermined intervals to its home position located adjacent the record area. With these movements, wiping is performed.

FIG. 5 is a vertical cross-sectional view of one embodiment of the ink cartridge which stores therein an ink to be fed to the recording head via an ink feed member, for example, a tube. Designated at numeral 40 is an ink reservoir, for example, an ink bag in which a feed ink is stored. A rubber-made plug 42 is arranged in an end of the ink bag 40. Insertion of a needle (not shown) into the plug 42 makes it possible to feed the ink from the ink bag 40 to the recording head. Designated at numeral 44 is a waste ink absorber 44 for catching waste ink. As the ink reservoir, one having an ink-contacting wall formed of a polyolefin, especially polyethylene is preferred.

An inkjet recording system suitable for use in the present invention is not limited to one including a recording head and an ink cartridge as discrete members as described above but also includes one including them as an integral unit as depicted in FIG. 6. In FIG. 6, numeral 70 designates a recording unit within which an ink reservoir means with an ink stored therein, for example, an ink absorbent is accommodated, and the ink in the ink absorbent is ejected as ink droplets from a recording head unit 71 equipped with plural orifices. As the material of the ink reservoir, use of polyurethane is preferred for the present invention. As an alternative, the ink reservoir may have a structure similar to an ink bag with a spring or the like accommodated therein instead of using an ink absorbent. Numeral 72 indicates a vent hole through which the interior of the cartridge is kept in communication with the air. This recording unit 70 can be used in place of the recording head 65 shown in FIG. 4, and is detachably mounted on the carriage 66.

(Inkjet Recording System Making Use of Mechanical Energy)

As a preferred embodiment of an inkjet recording system making use of mechanical energy, an on-demand inkjet recording head can be mentioned. This on-demand inkjet recording head is provided with a nozzle-defining plate having plural nozzles therein, pressure producing elements arranged opposite the nozzles and composed of a piezoelectric material and a conductive material, and an ink filling up around these pressure producing elements. By impressed voltages, the pressure producing elements are caused to displace to eject small droplets of the ink from the nozzles. One example of the construction of the recording head as a principal element in the inkjet recording system is depicted in FIG. 7.

The recording head includes an ink channel 80 communicated with an ink reservoir (not illustrated), an orifice plate 81 for ejecting ink droplets of a desired volume, a vibration plate 82 for applying pressure directly to an ink, a piezoelectric element 83 bonded with the vibration plate 82 and displaceable by electrical signals, and a substrate 84 fixedly supporting the orifice plate 81, the vibration plate 82 and the like.

In FIG. 7, the ink channel 80 is formed of a photosensitive resin or the like, the orifice plate 81 defines ejection nozzles 85 formed by subjecting a metal such as stainless steel or nickel to orifice creation by electroforming or pressing, the vibration plate 82 is formed of a metal film such as a stainless steel, nickel or titanium film or a high-modulus resin film, and the piezoelectric element 83 is formed of a dielectric material such as barium titanate or PZT. The recording head of the above-described construction operates such that a pulse-like voltage is applied across the piezoelectric element 83 to produce a stress deformation (strain), its energy then deforms the vibration plate 82 bonded to the piezoelectric element 83, and hence, the ink within the ink channel 80 is vertically pressurized to eject an ink droplet (not shown) from the ejection orifice 85 of the orifice plate 81 to perform recording. Such a recording head is used by assembling it in a similar inkjet recording system as in FIG. 4. Detailed operations of the inkjet recording system may be performed in a similar manner as in the above-mentioned one.

EXAMPLES

Based on Examples, the present invention will hereinafter be described in detail. It is, however, to be noted that the present invention shall not be limited to the following Examples. In the following description, all designations of "part" or "parts" and "%" are on a weight.

<Yellow (Y) Inks>

Example Y-1

(Preparation of a High-molecular Dispersant A)

Synthesis of an ABC triblock copolymer formed of one type of hydrophobic blocks and two types of hydrophilic blocks:

A glass vessel fitted with a three-way cock was purged with nitrogen gas, and then, heated at 250° C. under a nitrogen gas atmosphere to remove any adsorbed water of the internal vessel. After the internal vessel was allowed to cool down to room temperature, 2-(n-octadecanoxy) ethyl vinyl ether (12 mmol) as a hydrophobic monomer, ethyl acetate (16 mmol), and toluene (11 cm$^3$) were added. When the internal temperature of the system had dropped to 0° C., ethyl aluminum sesquichloride (0.2 mmol) was added to initiate polymerization, and the A blocks of an ABC triblock copolymer were synthesized.

Using a gel permeation column chromatography (GPC), the molecular weight was monitored in a time division manner. Subsequent to the completed polymerization of the A blocks, 2-(2-(2-(2-methoxyethoxy)ethoxy)ethoxy)ethylvinylether (the B blocks) (24 mmol) as a hydrophilic monomer was added, followed by the continuing polymerization. Likewise, by the GPC, the molecular weight was monitored. Subsequent to the completed polymerization of the B blocks, a vinyl monomer (12 mmol)—as a hydrophilic monomer— which had been obtained by esterifying the carboxyl group of 6-(2-vinyloxyethoxy)hexanoic acid (C block) with an ethyl group was added to conduct synthesis of C blocks. Termination of the polymerization reaction was effected by adding into the system a 0.3% solution of ammonia in methanol, followed by hydrolysing the esterified carboxylic groups to convert the ester into the carboxylic acid form in the solution of sodium hydroxide in methanol. Subsequent to the reaction, dichloromethane was added to the reaction mixture to dilute it. The resulting mixture was washed three times with 0.6 N hydrochloric acid solution and then three times with distilled water, followed by the concentration to dryness in an evaporator. The thus-dried product was dried in a vacuum to afford an ABC triblock copolymer (a high molecular dispersant A). Identification of the resultant triblock copolymer was conducted using NMR and GPC. (Mn=3.7×10$^4$, Mn/Mw=1.2). In addition, the solubility parameters of the hydrophobic A blocks and the hydrophilic BC blocks of the obtained high-molecular dispersant were determined to be 17.5 (J/cm$^3$)$^{1/2}$ and 19.8 (J/cm$^3$)$^{1/2}$, respectively.

(Preparation of a Colorant Dispersion Y-1)

C.I. Pigment Yellow 3 (1.0 part), and acetone (99.0 parts) were mixed, heated to 40° C., and then thoroughly stirred into a homogeneous solution. The solution was added to a solution of the high-molecular dispersant A (1.0 part) in acetone (99.0 parts), and after mixing, water (10.0 parts) was added. Subsequently, acetone was removed by a rotary evaporator to afford a colorant dispersion Y-1. The concentration of acetone in the resultant colorant dispersion was analyzed by gas chromatography; acetone was not detected, resulting in the conclusion that it did not remain in the colorant dispersion.

| <Preparation of an ink Y-1> | |
|---|---|
| Colorant dispersion Y-1 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink Y-1 according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800 and the aluminium compound: the high-molecular dispersant was 1:90.

Example Y-2

(Preparation of a Colorant Dispersion Y-2)

A colorant dispersion Y-2 was obtained in a similar manner as in Example Y-1 except that the colorant was changed to C.I. Pigment Yellow 74. The concentration of acetone in the resultant colorant dispersion was analyzed by gas chromatography. Acetone were not detected, resulting in the conclusion that it did not remain in the colorant dispersion.

| <Preparation of an ink Y-2> | |
|---|---|
| Colorant dispersion Y-2 | 50.0 parts |
| Triethylene glycol | 10.0 parts |
| Tripropylene glycol | 10.0 parts |
| An aqueous solution of calcium chloride (5.0%) | 1.0 part |
| An aqueous solution of aluminium hydroxide (0.01%) | 0.3 part |
| Deionized water | 28.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:230 and the aluminium compound: the high-molecular dispersant was 1:290.

Example Y-3

(Preparation of a Colorant Dispersion Y-3)

A colorant dispersion Y-3 was obtained in a similar manner as in Example Y-1 except that the colorant was changed to C.I. Pigment Yellow 93. The concentration of acetone in the resultant colorant dispersion was analyzed by gas chromatography. Acetone was not detected, resulting in the conclusion that they did not remain in the colorant dispersion.

| <Preparation of an ink Y-3> | |
|---|---|
| Colorant dispersion Y-3 | 50.0 parts |
| Triethylene glycol | 10.0 parts |
| Tripropylene glycol | 10.0 parts |
| An aqueous solution of calcium chloride (0.05%) | 0.5 part |
| An aqueous solution of aluminium hydroxide (0.01%) | 4.0 parts |
| Deionized water | 25.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000 and the aluminium compound: the high-molecular dispersant was 1:22.

Example Y-4

(Preparation of a Colorant Dispersion Y-4)

A colorant dispersion Y-4 was obtained in a similar manner as in Example Y-1 except that the colorant was changed to C.I. Pigment Yellow 95. The concentration of acetone in the resultant colorant dispersion was analyzed by gas chromatography. Acetone was not detected, resulting in the conclusion that it did not remain in the colorant dispersion.

| <Preparation of an ink Y-4> | |
|---|---|
| Colorant dispersion Y-4 | 30.0 parts |
| Triethylene glycol | 10.0 parts |
| Tripropylene glycol | 10.0 parts |
| An aqueous solution of calcium chloride (0.05%) | 0.3 part |
| An aqueous solution of aluminium hydroxide (0.01%) | 1.0 part |
| Deionized water | 48.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000 and the aluminium compound: the high-molecular dispersant was 1:53.

Example Y-5

(Preparation of a Colorant Dispersion Y-5)

C.I. Pigment Yellow 109 (1.0 part) and acetone (99.0 parts) were mixed; the mixed solution was heated to 40° C. and then thoroughly stirred into a homogeneous solution. The solution was added to a solution of the high-molecular dispersant A (0.1 part)—which dispersant A was used in Example Y-1—in acetone (99.9 parts), and after mixing, water (10.0 parts) was added. Subsequently, acetone was removed by a rotary evaporator to afford a colorant dispersion Y-5. The concentration of acetone in the resultant colorant dispersion was analyzed by gas chromatography. Acetone was not detected, resulting in the conclusion that it did not remain in the colorant dispersion.

| <Preparation of an ink Y-5> | |
|---|---|
| Colorant dispersion Y-5 | 60.0 parts |
| Triethylene glycol | 10.0 parts |
| Tripropylene glycol | 10.0 parts |
| An aqueous solution of calcium nitrate (0.1%) | 1.0 part |
| An aqueous solution of aluminium hydroxide (0.01%) | 0.5 part |
| Deionized water | 18.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:2,200 and the aluminium compound: the high-molecular dispersant was 1:23.

Example Y-6

(Preparation of a Colorant Dispersion Y-6)

C.I. Pigment Yellow 151 (0.5 part) and acetone (99.5 parts) were mixed; the mixed solution was heated to 40° C. and then thoroughly stirred into a homogeneous solution. The solution was added to a solution of the high-molecular dispersant A (1.0 part)—which dispersant A was used in Example Y-1—in acetone (99.0 parts), and after mixing, water (5.0 parts) was added. Subsequently, acetone was removed by a rotary evaporator to afford a colorant dispersion Y-6. The concentration of acetone in the resultant colorant dispersion was analyzed by gas chromatography. Acetone was not detected, resulting in the conclusion that it did not remain in the colorant dispersion.

| <Preparation of an ink Y-6> | |
|---|---|
| Colorant dispersion Y-6 | 65.0 parts |
| Triethylene glycol | 10.0 parts |
| Tripropylene glycol | 10.0 parts |
| An aqueous solution of magnesium chloride (1.0%) | 1.0 part |
| An aqueous solution of aluminium hydroxide (0.01%) | 1.0 part |
| Deionized water | 13.0 parts |

The above components were mixed and thoroughly stirred to afford the ink according to the present invention. Determination was conducted of a weight ratio of the magnesium compound to the high-molecular dispersant and a molar ratio of the aluminium compound to the high-molecular dispersant in the obtained ink; it was found that the magnesium compound: the high-molecular dispersant was 1:3,900 and the aluminium compound: the high-molecular dispersant was 1:210.

Example Y-7

(Preparation of a Colorant Dispersion Y-7)

A colorant dispersion Y-7 was obtained in a similar manner as in Example Y-1 except that the colorant was changed to C.I. Pigment Yellow 128. The concentration of acetone in the resultant colorant dispersion was analyzed by gas chromatography. Acetone was not detected, resulting in the conclusion that they did not remain in the colorant dispersion.

| <Preparation of an ink Y-7> | |
|---|---|
| Colorant dispersion Y-7 | 25.0 parts |
| Triethylene glycol | 10.0 parts |
| Tripropylene glycol | 10.0 parts |
| An aqueous solution of calcium oxide (0.05%) | 2.0 parts |
| An aqueous solution of magnesium nitrate (0.1%) | 1.0 part |
| An aqueous solution of aluminium oxide (0.01%) | 0.5 part |
| Deionized water | 51.5 parts |

The above components were mixed and thoroughly stirred to afford the ink according to the present invention. Determination was conducted of a weight ratio of a sum of the calcium compound and magnesium compound to the high-molecular dispersant and a molar ratio of the aluminium compound to the high-molecular dispersant in the obtained ink; it was found that the sum of the calcium compound and magnesium compound: the high-molecular dispersant was 1:2,400 and the aluminium compound: the high-molecular dispersant was 1:55.

Example Y-8

<Preparation of a High-molecular Dispersant B>

Synthesis of an AB diblock copolymer formed of one type of hydrophobic blocks and one type of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, 2-decanoxyethylvinyl ether (12 mmol) as a hydrophobic monomer, ethyl acetate (16 mmol), 1-isobutoxyethyl acetate (0.1 mmol) and toluene (11 cm³) were added. When the internal temperature of the system had dropped to 0° C., ethyl aluminum sesquichloride (0.2 mmol) was added to initiate polymerization, and the A blocks of an AB diblock copolymer was synthesized.

Using a column chromatography (GPC), the molecular weight was monitored in a time division manner. Subsequent to the completion of the polymerization of the A blocks, a vinyl monomer (12 mmol) which had been obtained by esterifying the carboxylic acid portion of 4-(2-vinyloxyethoxy) benzoic acid (B blocks) as a hydrophilic monomer with an ethyl group was added to conduct the synthesis of B blocks. Termination of the polymerization reaction was effected by adding into the system a 0.3% solution of ammonia in methanol. Esterified carboxylic groups were hydrolyzed with the solution of sodium hydroxide in methanol to convert the ester into the carboxylic acid form. In a similar way to the procedure of Example Y-1, an AB diblock copolymer (a high molecular dispersant B) was then obtained. Identification of the resultant diblock copolymer was conducted using NMR and GPC. (Mn=3.5×10⁴, Mn/Mw=1.2). In addition, the solubility parameter of the hydrophobic A blocks and that of the hydrophilic B blocks of the obtained high-molecular dispersant were determined to be 17.8 $(J/cm^3)^{1/2}$ and 24.9 $(J/cm^3)^{1/2}$, respectively.

(Preparation of a Colorant Dispersion Y-8)

C.I. Pigment Yellow 138 (1.0 part), and acetone (99.0 parts) were mixed, heated to 40° C., and then thoroughly stirred into a homogeneous solution. The solution was added to a solution of the high-molecular dispersant B (1.0 part) in acetone (99.0 parts), and after mixing, water (10.0 parts) was added. Subsequently, acetone was removed by a rotary evaporator to afford a colorant dispersion Y-8. The concentration of acetone in the resultant colorant dispersion was analyzed by gas chromatography; acetone was not detected, resulting in the conclusion that it did not remain in the colorant dispersion.

| <Preparation of an ink Y-8> | |
|---|---|
| Colorant dispersion Y-8 | 40.0 parts |
| Glycerine | 5.0 parts |
| Diethylene glycol | 10.0 parts |
| An aqueous solution of calcium chloride (0.2%) | 1.0 part |
| An aqueous solution of aluminium chloride (0.2%) | 1.0 part |
| Deionized water | 43.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:4,600 and the aluminium compound: the high-molecular dispersant was 1:6.

Example Y-9

<Preparation of a High-molecular Dispersant C>

Synthesis of an AB diblock copolymer formed of one type of hydrophobic blocks and one type of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, isobutylvinyl ether (12 mmol) as a hydrophobic monomer, ethyl acetate (16 mmol), 1-isobutoxyethyl acetate (0.1 mmol) and toluene (11 cm³) were added. When the internal temperature of the system had dropped to 0° C., ethyl aluminum sesquichloride (0.2 mmol) was added to initiate polymerization, and the A blocks of an AB diblock copolymer was synthesized.

Using a column chromatography (GPC), the molecular weight was monitored in a time division manner. Subsequent to the completion of the polymerization of the A blocks, a vinyl monomer (12 mmol) which had been obtained by silanizing (silylating) the hydroxyl group of 2-hydroxyethylvinylether as a hydrophilic monomer with trimethylchlorosilane was added to conduct synthesis of B blocks. Termination of the polymerization reaction was effected by adding into the system a 0.3% solution of ammonia in methanol. Hydrolysis of hydroxyl groups silanized (silylated) with trimethylchlorosilane was effected by adding water. The reaction-terminated reaction mixture was diluted by adding dichloromethane, washed with a 0.6N hydrogen chloride solution three times and then with distilled water three times. The washed reaction mixture was concentrated to dryness by using an evaporator; the dried sample further was dried under a vacuum to afford the AB diblock copolymer (a high-molecular dispersant C). Identification of the resultant diblock copolymer was conducted using NMR and GPC. (Mn=3.7× $10^4$, Mn/Mw=1.3). In addition, the solubility parameter of the hydrophobic A blocks and that of the hydrophilic B blocks of the obtained high-molecular dispersant were determined to be 17.1 $(J/cm^3)^{1/2}$ and 29.0 $(J/cm^3)^{1/2}$, respectively.

(Preparation of a Colorant Dispersion Y-9)

C.I. Pigment Yellow 120 (1.0 part), and acetone (99.0 parts) were mixed, heated to 40° C., and then thoroughly stirred into a homogeneous solution. The solution was added to a solution of the high-molecular dispersant C (1.0 part) in acetone (99.0 parts), and after mixing, water (10.0 parts) was added. Subsequently, acetone was removed by a rotary evaporator to afford a colorant dispersion Y-9. The concentration of acetone in the resultant colorant dispersion was analyzed by gas chromatography; acetone was not detected, resulting in the conclusion that it did not remain in the colorant dispersion.

| <Preparation of an ink Y-9> | |
|---|---|
| Colorant dispersion Y-9 | 60.0 parts |
| Glycerine | 11.0 parts |
| Ethylene glycol | 9.0 parts |
| An aqueous solution of calcium chloride (0.02%) | 1.0 part |
| An aqueous solution of aluminium chloride (0.01%) | 0.2 part |
| Deionized water | 18.8 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:69,000 and the aluminium compound: the high-molecular dispersant was 1:900.

Example Y-10

(Preparation of a Colorant Dispersion Y-10)

A colorant dispersion Y-10 was obtained in a similar manner as in Example Y-1 except that the colorant was changed to C.I. Pigment Yellow 175. The concentration of acetone in the resultant colorant dispersion was analyzed by gas chromatography. Acetone was not detected, resulting in the conclusion that they did not remain in the colorant dispersion.

| <Preparation of an ink Y-10> | |
|---|---|
| Colorant dispersion Y-10 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800 and the aluminium compound: the high-molecular dispersant was 1:90.

Example Y-11

(Preparation of a Colorant Dispersion Y-11)

A colorant dispersion Y-11 was obtained in a similar manner as in Example Y-1 except that the colorant was changed to C.I. Pigment Yellow 183. The concentration of acetone in the resultant colorant dispersion was analyzed by gas chromatography. Acetone was not detected, resulting in the conclusion that they did not remain in the colorant dispersion.

| <Preparation of an ink Y-11> | |
|---|---|
| Colorant dispersion Y-11 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound the high-molecular dispersant was 1:5,800; and the aluminium compound: the high-molecular dispersant was 1:90.

Example Y-12

(Preparation of a Colorant Dispersion Y-12)

A colorant dispersion Y-12 was obtained in a similar manner as in Example Y-1 except that the colorant was changed to C.I. Pigment Yellow 184. The concentration of acetone in the resultant colorant dispersion was analyzed by gas chromatography. Acetone was not detected, resulting in the conclusion that they did not remain in the colorant dispersion.

| <Preparation of an ink Y-12> | |
|---|---|
| Colorant dispersion Y-12 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800; and the aluminium compound: the high-molecular dispersant was 1:90.

Comparative Example Y-1

(Preparation of a Colorant Dispersion Y-13)
A colorant dispersion Y-13 was obtained in a similar manner as in Example Y-1 except that the colorant was changed to C.I. Pigment Yellow 74 used in Example Y-2 and a styrene-maleic acid random copolymer (number average molecular weight: 10,000) was used as a high-molecular dispersant.

<Preparation of an ink Y-13>

| | |
|---|---|
| Colorant dispersion Y-13 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford a comparative yellow ink.

Comparative Example Y-2

(Preparation of a Colorant Dispersion Y-14)
A colorant dispersion Y-14 was obtained in a similar manner as in Example Y-1 except that the colorant was changed to C.I. Pigment Yellow 74 used in Example Y-2 and a n-butyl methacrylate-methacrylic acid block copolymer (number average molecular weight: 10,000) was used as a high-molecular dispersant.

<Preparation of an ink Y-14>

| | |
|---|---|
| Colorant dispersion Y-14 | 50.0 parts |
| Triethylene glycol | 10.0 parts |
| Tripropylene glycol | 10.0 parts |
| Deionized water | 30.0 parts |

The above components were mixed and thoroughly stirred to afford a comparative yellow ink.

Comparative Example Y-3

(Preparation of a Colorant Dispersion Y-15)
A colorant dispersion Y-15 was obtained in a similar manner as in Example Y-1 except that the colorant was changed to C.I. Pigment Yellow 120 used in Example Y-9 and polyoxyethylene hexadecyl ether (HLB 12.9) was used as a dispersant.

<Preparation of an ink Y-15>

| | |
|---|---|
| Colorant dispersion Y-15 | 50.0 parts |
| Triethylene glycol | 10.0 parts |

-continued

<Preparation of an ink Y-15>

| | |
|---|---|
| Tripropylene glycol | 10.0 parts |
| Deionized water | 30.0 parts |

The above components were mixed and thoroughly stirred to afford a comparative yellow ink.

Comparative Example Y-4

<Preparation of an ink Y-16>

| | |
|---|---|
| C.I. Acid yellow 79 | 5.0 parts |
| Tripropylene glycol | 20.0 parts |
| Deionized water | 75.0 parts |

The above components were mixed and thoroughly stirred to afford a comparative yellow ink.

(Ranking)
The inks of Examples Y-1 to Y-12 and those of Comparative Examples Y-1 to Y-4 were separately loaded on an inkjet recording system—equipped with an on-demand multiple-nozzle recording head that ejects each ink by applying to the ink thermal energy corresponding to each recording signal—"BJF-660" (trade name, manufactured by Canon Inc.), and printing was performed on glossy paper, "SP101" (trade name, product of Canon Inc.), to rank the inks shown in Table 1. As presented in Table 1, all the inks of the Examples gave better results in ejection stability, image quality, and fastness than all the inks of the Comparative Examples.

TABLE 1

Ranking Results

| | Ranked characteristics | | | |
|---|---|---|---|---|
| | Ejection stability*1 | Image quality*2 | Light fastness*3 | Water-proofness*4 |
| Example Y-1 | A | A | A | A |
| Example Y-2 | A | A | A | A |
| Example Y-3 | A | A | A | A |
| Example Y-4 | A | A | A | A |
| Example Y-5 | A | A | A | A |
| Example Y-6 | A | A | A | A |
| Example Y-7 | A | A | A | A |
| Example Y-8 | B | A | A | A |
| Example Y-9 | B | B | A | A |
| Example Y-10 | A | A | A | A |
| Example Y-11 | A | A | A | A |
| Example Y-12 | A | A | A | A |
| Comp. Ex. Y-1 | D | D | B | B |
| Comp. Ex. Y-2 | C | C | B | A |
| Comp. Ex. Y-3 | D | D | B | B |
| Comp. Ex. Y-4 | B | B | C | C |

*1: Ejection Stability
After each ink had been kept for one month at 60° C., under an environment of 5° C. and 10% R.H., a 100% solid image was printed. After the printing was stopped for 1 minute, a 100% solid image was printed again. The latter 100% solid image was ranked in accordance with the following ranking standards.
A: Normally printed without any white steak.
B: Slight white streaks were observed at the beginning of the print.

C: White steaks were observed over the entire image.

D: Practically no image was printed.

*2: Image Quality

After each ink had been kept for one month at 60° C., under an environment of 5° C. and 10% R.H., a crosshatch pattern was printed with 25 mm interline spacings, and the image so printed was ranked in accordance with the following ranking standards.

- A: No printing disorder was observed at all even under a microscope, and the crosshatch pattern was normally printed with 25 mm interline spacings.
- B: Some printing disorder was locally observed under a microscope, but the crosshatch pattern was normally printed with 25 mm interline spacings.
- C: Some printing disorder was locally observed even with the naked eye, and the crosshatch pattern was locally offset from 25 mm interline spacings.
- D: Printing disorder was observed with the naked eye over the entire crosshatch pattern, and the crosshatch pattern was offset from 25 mm interline spacings at the entire area thereof.

*3: Light Fastness

A print was exposed to light for 100 hours under a Xenon lamp; and the reflection density of the image was measured both before and after the exposure. A percent remainder of the image density after the light fastness test was determined as a scale of light fastness. The following ranking standards were followed.

- A: Percent remainder of image density≧95%
- B: 95%>Percent remainder of image density≧90%
- C: 90%>Percent remainder of image density

*4: Waterproofness

After a printed paper had been left over for 12 hours or longer subsequent to its printing, the reflection density of the image was measured. Further, the printed paper was kept still for 5 minutes in tap water. After water was dried off, the reflection density of the image was measured to determine, as a scale of waterproofness, a percent remainder of the image density after the waterproofness test. Ranking was performed in accordance with the following ranking standards.

- A: Percent remainder of image density≧90%
- B: 90%>Percent remainder of image density≧80%
- C: 80%>Percent remainder of image density <Black (Bk) Inks>

As high-molecular dispersants, the same high-molecular dispersants as those used for the above yellow inks were used.

Example Bk-1

(Preparation of a Colorant Dispersion Bk-1)

C.I. Pigment Black 7 (1.0 part) and acetone (99.0 parts) were mixed, heated to 40° C., and then thoroughly stirred into a homogeneous solution. The mixed solution was added to a solution of the above high-molecular dispersant A (1.0 part) in acetone (99.0 parts), and after mixing, water (10.0 parts) was added. Subsequently, acetone was removed by a rotary evaporator to afford a colorant dispersion Bk-1. The concentration of acetone in the resultant colorant dispersion was analyzed by gas chromatography. Acetone was not detected, resulting in the conclusion that acetone did not remain in the colorant dispersion.

| <Preparation of an ink Bk-1> | |
| --- | --- |
| Colorant dispersion Bk-1 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800; and the aluminium compound: the high-molecular dispersant was 1:90.

Example Bk-2

(Preparation of a Colorant Dispersion Bk-2)

A colorant dispersion Bk-2 was obtained in a similar manner as in Example Bk-1 except that the colorant was changed to C.I. Pigment Black 1. Subsequently, acetone was removed by a rotary evaporator to afford a colorant dispersion Bk-1. The concentration of acetone in the resultant colorant dispersion was analyzed by gas chromatography. Acetone was not detected, resulting in the conclusion that acetone did not remain in the colorant dispersion.

| <Preparation of an ink Bk-2> | |
| --- | --- |
| Colorant dispersion Bk-2 | 50.0 parts |
| Triethylene glycol | 10.0 parts |
| Tripropylene glycol | 10.0 parts |
| An aqueous solution of calcium chloride (5.0%) | 1.0 part |
| An aqueous solution of aluminium hydroxide (0.01%) | 0.3 part |
| Deionized water | 28.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:230; and the aluminium compound: the high-molecular dispersant was 1:290.

Example Bk-3

(Preparation of a Colorant Dispersion Bk-3)

A colorant dispersion Bk-3 was obtained in a similar manner as in Example Bk-1 except that the colorant was changed to C.I. Pigment Black 10. Subsequently, acetone was removed by a rotary evaporator to afford a colorant dispersion Bk-3. The concentration of acetone in the resultant colorant dispersion was analyzed by gas chromatography. Acetone was not detected, resulting in the conclusion that acetone did not remain in the colorant dispersion.

<Preparation of an ink Bk-3>

| | |
|---|---|
| Colorant dispersion Bk-3 | 50.0 parts |
| Triethylene glycol | 10.0 parts |
| Tripropylene glycol | 10.0 parts |
| An aqueous solution of calcium chloride (0.05%) | 0.5 part |
| An aqueous solution of aluminium hydroxide (0.01%) | 4.0 parts |
| Deionized water | 25.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:22.

Example Bk-4

(Preparation of a Colorant Dispersion Bk-4)

C.I. Pigment Black 1 (0.95 part) and C.I. Pigment Yellow 154 (0.05 part) and acetone (99.0 parts) were mixed, heated to 40° C., and then thoroughly stirred into a homogeneous solution. The mixed solution was added to a solution of the above high-molecular dispersant A (1.0 part) in acetone (99.0 parts), and after mixing, water (10.0 parts) was added. Subsequently, acetone was removed by a rotary evaporator to afford a colorant dispersion Bk-4. The concentration of acetone in the resultant colorant dispersion was analyzed by gas chromatography. Acetone was not detected, resulting in the conclusion that acetone did not remain in the colorant dispersion.

<Preparation of an ink Bk-4>

| | |
|---|---|
| Colorant dispersion Bk-4 | 30.0 parts |
| Triethylene glycol | 10.0 parts |
| Tripropylene glycol | 10.0 parts |
| An aqueous solution of calcium chloride (0.05%) | 0.3 part |
| An aqueous solution of aluminium hydroxide (0.01%) | 1.0 part |
| Deionized water | 48.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:53.

Example Bk-5

(Preparation of a Colorant Dispersion Bk-5)

C.I. Pigment Black 31 (1.0 part) and acetone (99.0 parts) were mixed, heated to 40° C., and then thoroughly stirred into a homogeneous solution. The mixed solution was added to a solution of the above high-molecular dispersant A (0.1 part)—used in Example Bk-1—in acetone (99.9 parts), and after mixing, water (10.0 parts) was added. Subsequently, acetone was removed by a rotary evaporator to afford a colorant dispersion Bk-5. The concentration of acetone in the resultant colorant dispersion was analyzed by gas chromatography. Acetone was not detected, resulting in the conclusion that acetone did not remain in the colorant dispersion.

<Preparation of an ink Bk-5>

| | |
|---|---|
| Colorant dispersion Bk-5 | 60.0 parts |
| Triethylene glycol | 10.0 parts |
| Tripropylene glycol | 10.0 parts |
| An aqueous solution of calcium nitrate (0.1%) | 1.0 part |
| An aqueous solution of aluminium hydroxide (0.01%) | 0.5 part |
| Deionized water | 18.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:2,200; and the aluminium compound: the high-molecular dispersant was 1:23.

Example Bk-6

(Preparation of a Colorant Dispersion Bk-6)

C.I. Pigment Black 32 (0.5 part) and acetone (99.5 parts) were mixed, heated to 40° C., and then thoroughly stirred into a homogeneous solution. The mixed solution was added to a solution of the high-molecular dispersant A (1.0 part)—used in Example Bk-1—in acetone (99.0 parts), and after mixing, water (5.0 parts) was added. Subsequently, acetone was removed by a rotary evaporator to afford a colorant dispersion Bk-6. The concentration of acetone in the resultant colorant dispersion was analyzed by gas chromatography. Acetone was not detected, resulting in the conclusion that acetone did not remain in the colorant dispersion.

<Preparation of an ink Bk-6>

| | |
|---|---|
| Colorant dispersion Bk-6 | 65.0 parts |
| Triethylene glycol | 10.0 parts |
| Tripropylene glycol | 10.0 parts |
| An aqueous solution of magnesium chloride (1.0%) | 1.0 part |
| An aqueous solution of aluminium hydroxide (0.01%) | 1.0 part |
| Deionized water | 13.0 parts |

The above components were mixed and thoroughly stirred to afford the ink according to the present invention. Determination was conducted of a weight ratio of the magnesium compound to the high-molecular dispersant and a molar ratio of the aluminium compound to the high-molecular dispersant in the obtained ink; it was found that the magnesium compound: the high-molecular dispersant was 1:3,900; and the aluminium compound: the high-molecular dispersant was 1:210.

Example Bk-7

<Preparation of an ink Bk-7>

| Colorant dispersion Bk-3 | 25.0 parts |
| --- | --- |
| Triethylene glycol | 10.0 parts |
| Tripropylene glycol | 10.0 parts |
| An aqueous solution of calcium oxide (0.05%) | 2.0 parts |
| An aqueous solution of magnesium nitrate (0.1%) | 1.0 part |
| An aqueous solution of aluminium oxide (0.01%) | 0.5 part |
| Deionized water | 51.5 parts |

The above components were mixed and thoroughly stirred to afford the ink according to the present invention. Determination was conducted of a weight ratio of a sum of the calcium compound and magnesium compound to the high-molecular dispersant and a molar ratio of the aluminium compound to the high-molecular dispersant in the obtained ink; it was found that a sum of the calcium compound and magnesium compound: the high-molecular dispersant was 1:2,400; and the aluminium compound: the high-molecular dispersant was 1:55.

Example Bk-8

(Preparation of a Colorant Dispersion Bk-7)

C.I. Pigment Black 1 (1.0 part) and acetone (99.0 parts) were mixed, heated to 40° C., and then thoroughly stirred into a homogeneous solution. The mixed solution was added to a solution of the above high-molecular dispersant B (1.0 part) in acetone (99.0 parts), and after mixing, water (10.0 parts) was added. Subsequently, acetone was removed by a rotary evaporator to afford a colorant dispersion Bk-7. The concentration of acetone in the resultant colorant dispersion was analyzed by gas chromatography. Acetone was not detected, resulting in the conclusion that acetone did not remain in the colorant dispersion.

<Preparation of an ink Bk-8>

| Colorant dispersion Bk-7 | 40.0 parts |
| --- | --- |
| Glycerine | 5.0 parts |
| Diethylene glycol | 10.0 parts |
| An aqueous solution of calcium chloride (0.2%) | 1.0 part |
| An aqueous solution of aluminium chloride (0.2%) | 1.0 part |
| Deionized water | 43.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:4,600; and the aluminium compound: the high-molecular dispersant was 1:6.

Example Bk-9

(Preparation of a Colorant Dispersion Bk-8)

C.I. Pigment Black 7 (1.0 part) and acetone (99.0 parts) were mixed, heated to 40° C., and then thoroughly stirred into a homogeneous solution. The mixed solution was added to a solution of the above high-molecular dispersant C (1.0 part) in acetone (99.0 parts), and after mixing, water (10.0 parts) was added. Subsequently, acetone was removed by a rotary evaporator to afford a colorant dispersion Bk-8. The concentration of acetone in the resultant colorant dispersion was analyzed by gas chromatography. Acetone was not detected, resulting in the conclusion that acetone did not remain in the colorant dispersion.

<Preparation of an ink Bk-9>

| Colorant dispersion Bk-8 | 60.0 parts |
| --- | --- |
| Glycerine | 11.0 parts |
| Ethylene glycol | 9.0 parts |
| An aqueous solution of calcium chloride (0.02%) | 1.0 part |
| An aqueous solution of aluminium chloride (0.01%) | 0.2 part |
| Deionized water | 18.8 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:69,000; and the aluminium compound: the high-molecular dispersant was 1:900.

Comparative Example Bk-1

(Preparation of a Colorant Dispersion Bk-9)

A colorant dispersion Bk-9 was obtained in a similar manner as in Example Bk-1 except that C.I. Pigment Black 7 used in Example Bk-1 was used as a colorant and a styrene-maleic acid random copolymer (number average molecular weight: 10,000) was used as a high-molecular dispersant.

<Preparation of an ink Bk-10>

| Colorant dispersion Bk-9 | 50.0 parts |
| --- | --- |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford a comparative ink.

Comparative Example Bk-2

(Preparation of a Colorant Dispersion Bk-10)

A colorant dispersion Bk-10 was obtained in a similar manner as in Example Bk-1 except that C.I. Pigment Black 7 used in Example Bk-1 was used as a colorant and an n-butyl methacrylate-methacrylic acid block copolymer (number average molecular weight: 10,000) was used as a high-molecular dispersant.

| <Preparation of an ink Bk-11> | |
|---|---|
| Colorant dispersion Bk-10 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example Bk-3

(Preparation of a Colorant Dispersion Bk-11)

A colorant dispersion Bk-11 was obtained in a similar manner as in Example Bk-1 except that C.I. Pigment Black 1 used in Example Bk-2 was used as a colorant and polyoxyethylene hexadecyl ether (HLB 12.9) was used as a dispersant.

| <Preparation of an ink Bk-12> | |
|---|---|
| Colorant dispersion Bk-11 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example Bk-4

| <Preparation of an ink Bk-13> | |
|---|---|
| C.I. Food Black 1 | 5.0 parts |
| Tripropylene glycol | 20.0 parts |
| Deionized water | 75.0 parts |

The above components were mixed and thoroughly stirred to afford a comparative ink.

(Ranking)

Printing was conducted in a similar manner as the one in the case of the above-described yellow inks, with the ranking shown in Table 2. As a result, as presented in Table 2, all the inks of the Examples gave better results in ejection stability, image quality, and fastness than all the inks of the Comparative Examples.

TABLE 3

| | Ranking Results | | | |
|---|---|---|---|---|
| | Ranked characteristics | | | |
| | Ejection stability *1 | Image quality *2 | Light fastness *3 | Water-proofness |
| Example Bk-1 | A | A | A | A |
| Example Bk-2 | A | A | A | A |
| Example Bk-3 | A | A | A | A |
| Example Bk-4 | A | A | A | A |
| Example Bk-5 | A | A | A | A |
| Example Bk-6 | A | A | A | A |
| Example Bk-7 | A | A | A | A |
| Example Bk-8 | B | A | A | A |
| Example Bk-9 | B | B | A | A |
| Comp. Ex. Bk-1 | D | D | A | B |
| Comp. Ex. Bk-2 | C | C | A | B |
| Comp. Ex. Bk-3 | D | D | B | B |
| Comp. Ex. Bk-4 | B | B | C | C |

*1: Ejection stability (the like in the case of the yellow inks)
*2: Image quality (the like in the case of the yellow inks)
*3: Light-fastness
A print was exposed to light for 100 hours under a Xenon lamp. The reflection density of the image was measured both before and after the exposure. A percent remainder of the image density after the light fastness test was determined as a scale of light fastness. The following ranking standards were followed.
A: Percent remainder of image density ≧ 90%
B: 90% > Percent remainder of image density ≧ 80%
C: 80% > Percent remainder of image density
*4: Waterproofness (the like in the case of the yellow inks)

<Magenta (M) Inks>

As high-molecular dispersants, the same high-molecular dispersants as those used in the yellow inks were used.

Example M-1

(Preparation of a Colorant Dispersion M-1)

C.I. Pigment Red 12 (1.0 part) and acetone (99.0 parts) were mixed, heated to 40° C., and then thoroughly stirred into a homogeneous solution. The mixed solution was added to a solution of the above high-molecular dispersant A (1.0 part) in acetone (99.0 parts), and after mixing, water (10.0 parts) was added. Subsequently, acetone was removed by a rotary evaporator to afford a colorant dispersion M-1. The concentration of acetone in the resultant colorant dispersion was analyzed by gas chromatography. Acetone was not detected, resulting in the conclusion that they did not remain in the colorant dispersion.

| <Preparation of an ink M-1> | |
|---|---|
| Colorant dispersion M-1 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800; and the aluminium compound: the high-molecular dispersant was 1:90.

Example M-2

(Preparation of a Colorant Dispersion M-2)

A colorant dispersion M-2 was obtained in a similar manner as in Example M-1 except that the colorant was changed to C.I. Pigment Red 122. The concentrations of acetone in the obtained colorant dispersion was analyzed by gas chromatography. Acetone was not detected, resulting in the conclusion that they did not remain in the colorant dispersion.

| <Preparation of an ink M-2> | |
|---|---|
| Colorant dispersion M-2 | 50.0 parts |
| Triethylene glycol | 10.0 parts |
| Tripropylene glycol | 10.0 parts |
| An aqueous solution of calcium chloride (5.0%) | 1.0 part |
| An aqueous solution of aluminium hydroxide (0.01%) | 0.3 part |
| Deionized water | 28.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:230; and the aluminium compound: the high-molecular dispersant was 1:290.

Example M-3

(Preparation of a Colorant Dispersion M-3)

A colorant dispersion M-3 was obtained in a similar manner as in Example M-1 except that the colorant was changed to C.I. Pigment Red 184. The concentrations of acetone in the obtained colorant dispersion was analyzed by gas chromatography. Acetone was not detected, resulting in the conclusion that they did not remain in the colorant dispersion.

| <Preparation of an ink M-3> | |
|---|---|
| Colorant dispersion M-3 | 50.0 parts |
| Triethylene glycol | 10.0 parts |
| Tripropylene glycol | 10.0 parts |
| An aqueous solution of calcium chloride (0.05%) | 0.5 part |
| An aqueous solution of aluminium hydroxide (0.01%) | 4.0 parts |
| Deionized water | 25.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:22.

Example M-4

(Preparation of a Colorant Dispersion M-4)

A colorant dispersion M-4 was obtained in a similar manner as in Example M-1 except that the colorant was changed to C.I. Pigment Red 202. The concentrations of acetone in the obtained colorant dispersion was analyzed by gas chromatography. Acetone was not detected, resulting in the conclusion that they did not remain in the colorant dispersion.

| <Preparation of an ink M-4> | |
|---|---|
| Colorant dispersion M-4 | 30.0 parts |
| Triethylene glycol | 10.0 parts |
| Tripropylene glycol | 10.0 parts |
| An aqueous solution of calcium chloride (0.05%) | 0.3 part |
| An aqueous solution of aluminium hydroxide (0.01%) | 1.0 part |
| Deionized water | 48.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:53.

Example M-5

(Preparation of a Colorant Dispersion M-5)

C.I. Pigment Violet 19 (1.0 part) and acetone (99.0 parts) were mixed, heated to 40° C., and then thoroughly stirred into a homogeneous solution. The mixed solution was added to a solution of the above high-molecular dispersant A (0.1 part)—used in Example M-1—in acetone (99.9 parts), and after mixing, water (10.0 parts) was added. Subsequently, acetone was removed by a rotary evaporator to afford a colorant dispersion M-5. The concentrations of acetone in the obtained colorant dispersion was analyzed by gas chromatography. Acetone was not detected, resulting in the conclusion that they did not remain in the colorant dispersion.

| <Preparation of an ink M-5> | |
|---|---|
| Colorant dispersion M-5 | 60.0 parts |
| Triethylene glycol | 10.0 parts |
| Tripropylene glycol | 10.0 parts |
| An aqueous solution of calcium nitrate (0.1%) | 1.0 part |
| An aqueous solution of aluminium hydroxide (0.01%) | 0.5 part |
| Deionized water | 18.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:2,200; and the aluminium compound: the high-molecular dispersant was 1:23.

Example M-6

(Preparation of a Colorant Dispersion M-6)

C.I. Pigment Violet 32 (0.5 part) and acetone (99.5 parts) were mixed, heated to 40° C., and then thoroughly stirred into a homogeneous solution. The mixed solution was added to a solution of the above high-molecular dispersant A (1.0 part)—used in Example M-1—in acetone (99.0 parts), and after mixing, water (5.0 parts) was added. Subsequently, acetone was removed by a rotary evaporator to afford a colorant dispersion M-6. The concentrations of acetone in the obtained colorant dispersion was analyzed by gas chromatography. Acetone was not detected, resulting in the conclusion that they did not remain in the colorant dispersion.

| <Preparation of an ink M-6> | |
|---|---|
| Colorant dispersion M-6 | 65.0 parts |
| Triethylene glycol | 10.0 parts |
| Tripropylene glycol | 10.0 parts |
| An aqueous solution of magnesium chloride (1.0%) | 1.0 part |
| An aqueous solution of aluminium hydroxide (0.01%) | 1.0 part |
| Deionized water | 13.0 parts |

The above components were mixed and thoroughly stirred to afford the ink according to the present invention. Determination of a weight ratio of the magnesium compound to the high-molecular dispersant and a molar ratio of the aluminium compound to the high-molecular dispersant in the obtained ink; it was found that the magnesium compound: the high-molecular dispersant was 1:3,900; and the aluminium compound: the high-molecular dispersant was 1:210.

Example M-7

| <Preparation of an ink M-7> | |
|---|---|
| Colorant dispersion M-2 | 25.0 parts |
| Triethylene glycol | 10.0 parts |
| Tripropylene glycol | 10.0 parts |
| An aqueous solution of calcium oxide (0.05%) | 2.0 parts |
| An aqueous solution of magnesium nitrate (0.1%) | 1.0 part |
| An aqueous solution of aluminium oxide (0.01%) | 0.5 part |
| Deionized water | 51.5 parts |

The above components were mixed and thoroughly stirred to afford the ink according to the present invention. Determination was conducted of a weight ratio of a sum of the calcium compound and magnesium compound to the high-molecular dispersant and a molar ratio of the aluminium compound to the high-molecular dispersant in the obtained ink; it was found that a sum of the calcium compound and magnesium compound: the high-molecular dispersant was 1:2,400; and the aluminium compound: the high-molecular dispersant was 1:55.

Example M-8

(Preparation of a Colorant Dispersion M-7)

C.I. Pigment Red 184 (1.0 part) and acetone (99.0 parts) were mixed, heated to 40° C., and then thoroughly stirred into a homogeneous solution. The mixed solution was added to a solution of the above high-molecular dispersant B (1.0 part) in acetone (99.0 parts), and after mixing, water (10.0 parts) was added. Subsequently, acetone was removed by a rotary evaporator to afford a colorant dispersion M-7. The concentrations of acetone in the obtained colorant dispersion was analyzed by gas chromatography. Acetone was not detected, resulting in the conclusion that they did not remain in the colorant dispersion.

| <Preparation of an ink M-8> | |
|---|---|
| Colorant dispersion M-7 | 40.0 parts |
| Glycerine | 5.0 parts |
| Diethylene glycol | 10.0 parts |
| An aqueous solution of calcium chloride (0.2%) | 1.0 part |
| An aqueous solution of aluminium chloride (0.2%) | 1.0 part |
| Deionized water | 43.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:4,600; and the aluminium compound: the high-molecular dispersant was 1:6.

Example M-9

(Preparation of a Colorant Dispersion M-8)

C.I. Pigment Red 122 (1.0 part) and acetone (99.0 parts) were mixed, heated to 40° C., and then thoroughly stirred into a homogeneous solution. The mixed solution was added to a solution of the above high-molecular dispersant C (1.0 part) in acetone (99.0 parts), and after mixing, water (10.0 parts) was added. Subsequently, acetone was removed by a rotary evaporator to afford a colorant dispersion M-8. The concentrations of acetone in the obtained colorant dispersion was analyzed by gas chromatography. Acetone was not detected, resulting in the conclusion that they did not remain in the colorant dispersion.

| <Preparation of an ink M-9> | |
|---|---|
| Colorant dispersion M-8 | 60.0 parts |
| Glycerine | 11.0 parts |
| Ethylene glycol | 9.0 parts |
| An aqueous solution of calcium chloride (0.02%) | 1.0 part |
| An aqueous solution of aluminium chloride (0.01%) | 0.2 part |
| Deionized water | 18.8 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:69,000; and the aluminium compound: the high-molecular dispersant was 1:900.

Comparative Example M-1

(Preparation of a Colorant Dispersion M-9)

A colorant dispersion M-9 was obtained in a similar manner as in Example M-1 except that C.I. Pigment Red 122 used in Example M-2 was used as a coolant and a styrene-maleic acid random copolymer (number average molecular weight: 10,000) were used as a high-molecular dispersant.

<Preparation of an ink M-10>

| | |
|---|---|
| Colorant dispersion M-9 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford a comparative ink.

Comparative Example M-2

(Preparation of a Colorant Dispersion M-10)
A colorant dispersion M-10 was obtained in a similar manner as in Example M-1 except that C.I. Pigment Red 122 used in Example M-2 was used as a colorant and an n-butyl methacrylate-methacrylic acid block copolymer (number average molecular weight: 10,000) were used as a high-molecular dispersant.

<Preparation of an ink M-11>

| | |
|---|---|
| Colorant dispersion M-10 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example M-3

(Preparation of a Colorant Dispersion M-11)
A colorant dispersion M-11 was obtained in a similar manner as in Example M-1 except that C.I. Pigment Red 184 used in Example M-3 was used as a colorant and polyoxyethylene-hexadecyl ether (HLB12.9) were used as a high-molecular dispersant.

<Preparation of an ink M-12>

| | |
|---|---|
| Colorant dispersion M-11 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example M-4

<Preparation of an ink M-13>

| | |
|---|---|
| C.I. Direct Red 80 | 5.0 parts |
| Tripropylene glycol | 20.0 parts |
| Deionized water | 75.0 parts |

The above components were mixed and thoroughly stirred to afford a comparative ink.

(Ranking)

The inks shown in Table 3 were ranked in a similar manner and in accordance with similar ranking standards as the manner and the standards in the case of the above-described Black inks, respectively. As presented in Table 3, all the inks of the Examples gave better results in ejection stability, image quality and light fastness than all the inks of the Comparative Examples.

TABLE 3

Ranking Results

| | Ranked characteristics | | | |
|---|---|---|---|---|
| | Ejection stability | Image quality | Light fastness | Water-proofness |
| Example M-1 | A | A | A | A |
| Example M-2 | A | A | A | A |
| Example M-3 | A | A | A | A |
| Example M-4 | A | A | A | A |
| Example M-5 | A | A | A | A |
| Example M-6 | A | A | A | A |
| Example M-7 | A | A | A | A |
| Example M-8 | B | A | A | A |
| Example M-9 | B | B | A | A |
| Comp. Ex. M-1 | D | D | B | B |
| Comp. Ex. M-2 | C | C | B | A |
| Comp. Ex. M-3 | D | D | B | B |
| Comp. Ex. M-4 | B | B | C | C |

<Cyan (C) Inks>

As high-molecular dispersants, the same high-molecular dispersants as those used in the yellow inks were used.

Example C-1

(Preparation of a Colorant Dispersion C-1)
C.I. Pigment Blue 16 (1.0 part), and acetone (99.0 parts) were mixed, heated to 40° C., and then thoroughly stirred into a homogeneous solution. The solution was added to a solution of the high-molecular dispersant A (1.0 part) in acetone (99.0 parts), and after mixing, water (10.0 parts) was added. Subsequently, acetone was removed by a rotary evaporator to afford a colorant dispersion C-1. The concentration of acetone in the resultant colorant dispersion was analyzed by gas chromatography. Acetone was not detected, resulting in the conclusion that it did not remain in the colorant dispersion.

<Preparation of an ink C-1>

| | |
|---|---|
| Colorant dispersion C-1 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:5,800; and the aluminium compound: the high-molecular dispersant was 1:90.

Example C-2

(Preparation of a Colorant Dispersion C-2)

A colorant dispersion C-2 was obtained in a similar manner as in Example C-1 except that the colorant used in Example C-1 was changed to C.I. Pigment Blue 15:1. The concentration of acetone in the resultant colorant dispersion was analyzed by gas chromatography. Acetone was not detected, resulting in the conclusion that it did not remain in the colorant dispersion.

| <Preparation of an ink C-2> | |
|---|---|
| Colorant dispersion C-2 | 50.0 parts |
| Triethylene glycol | 10.0 parts |
| Tripropylene glycol | 10.0 parts |
| An aqueous solution of calcium chloride (5.0%) | 1.0 part |
| An aqueous solution of aluminium hydroxide (0.01%) | 0.3 part |
| Deionized water | 28.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:230; and the aluminium compound: the high-molecular dispersant was 1:290.

Example C-3

(Preparation of a Colorant Dispersion C-3)

A colorant dispersion C-3 was obtained in a similar manner as in Example C-1 except that the colorant used in Example C-1 was changed to C.I. Pigment Blue 15:2. The concentration of acetone in the resultant colorant dispersion was analyzed by gas chromatography. Acetone was not detected, resulting in the conclusion that it did not remain in the colorant dispersion.

| <Preparation of an ink C-3> | |
|---|---|
| Colorant dispersion C-3 | 50.0 parts |
| Triethylene glycol | 10.0 parts |
| Tripropylene glycol | 10.0 parts |
| An aqueous solution of calcium chloride (0.05%) | 0.5 part |
| An aqueous solution of aluminium hydroxide (0.01%) | 4.0 parts |
| Deionized water | 25.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:22.

Example C-4

(Preparation of a Colorant Dispersion C-4)

A colorant dispersion C-4 was obtained in a similar manner as in Example C-1 except that the colorant used in Example C-1 was changed to C.I. Pigment Blue 15:3. The concentration of acetone in the resultant colorant dispersion was analyzed by gas chromatography. Acetone was not detected, resulting in the conclusion that it did not remain in the colorant dispersion.

| <Preparation of an ink C-4> | |
|---|---|
| Colorant dispersion C-4 | 30.0 parts |
| Triethylene glycol | 10.0 parts |
| Tripropylene glycol | 10.0 parts |
| An aqueous solution of calcium chloride (0.05%) | 0.3 part |
| An aqueous solution of aluminium hydroxide (0.01%) | 1.0 part |
| Deionized water | 48.7 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:46,000; and the aluminium compound: the high-molecular dispersant was 1:53.

Example C-5

(Preparation of a Colorant Dispersion C-5)

C.I. Pigment Blue 15:4 (1.0 part), and acetone (99.0 parts) were mixed, heated to 40° C., and then thoroughly stirred into a homogeneous solution. The solution was added to a solution of the high-molecular dispersant A (0.1 part)—used in Example C-1—in acetone (99.9 parts), and after mixing, water (10.0 parts) was added. Subsequently, acetone was removed by a rotary evaporator to afford a colorant dispersion C-5. The concentration of acetone in the resultant colorant dispersion was analyzed by gas chromatography. Acetone was not detected, resulting in the conclusion that it did not remain in the colorant dispersion.

| <Preparation of an ink C-5> | |
|---|---|
| Colorant dispersion C-5 | 60.0 parts |
| Triethylene glycol | 10.0 parts |
| Tripropylene glycol | 10.0 parts |
| An aqueous solution of calcium nitrate (0.1%) | 1.0 part |
| An aqueous solution of aluminium hydroxide (0.01%) | 0.5 part |
| Deionized water | 18.5 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:2,200; and the aluminium compound: the high-molecular dispersant was 1:23.

Example C-6

(Preparation of a Colorant Dispersion C-6)

C.I. Pigment Blue 15:6 (0.5 part), and acetone (99.5 parts) were mixed, heated to 40° C., and then thoroughly stirred into a homogeneous solution. The solution was added to a solution of the high-molecular dispersant A (1.0 part)—used in Example C-1—in acetone (99.0 parts), and after mixing, water (5.0 parts) was added. Subsequently, acetone was removed by a rotary evaporator to afford a colorant dispersion C-6. The concentration of acetone in the resultant colorant dispersion was analyzed by gas chromatography. Acetone was not detected, resulting in the conclusion that it did not remain in the colorant dispersion.

| <Preparation of an ink C-6> | |
|---|---|
| Colorant dispersion C-6 | 65.0 parts |
| Triethylene glycol | 10.0 parts |
| Tripropylene glycol | 10.0 parts |
| An aqueous solution of magnesium chloride (1.0%) | 1.0 part |
| An aqueous solution of aluminium hydroxide (0.01%) | 1.0 part |
| Deionized water | 13.0 parts |

The above components were mixed and thoroughly stirred to afford the ink according to the present invention. Determination was conducted of a weight ratio of the magnesium compound to the high-molecular dispersant and a molar ratio of the aluminium compound to the high-molecular dispersant in the obtained ink; it was found that the magnesium compound: the high-molecular dispersant was 1:3,900; and the aluminium compound: the high-molecular dispersant was 1:210.

Example C-7

(Preparation of a Colorant Dispersion C-7)

A colorant dispersion C-7 was obtained in a similar manner as in Example C-1 except that the colorant used in Example C-1 was changed to C.I. Pigment Green 7. The concentration of acetone in the resultant colorant dispersion was analyzed by gas chromatography. Acetone was not detected, resulting in the conclusion that it did not remain in the colorant dispersion.

| <Preparation of an ink C-7> | |
|---|---|
| Colorant dispersion C-7 | 25.0 parts |
| Triethylene glycol | 10.0 parts |
| Tripropylene glycol | 10.0 parts |
| An aqueous solution of calcium oxide (0.05%) | 2.0 parts |
| An aqueous solution of magnesium nitrate (0.1%) | 1.0 part |
| An aqueous solution of aluminium oxide (0.01%) | 0.5 part |
| Deionized water | 51.5 parts |

The above components were mixed and thoroughly stirred to afford the ink according to the present invention. Determination was conducted of a weight ratio of the sum of the calcium compound and magnesium compound to the high-molecular dispersant and a molar ratio of the aluminium compound to the high-molecular dispersant in the obtained ink; it was found that the sum of the calcium compound and magnesium compound: the high-molecular dispersant was 1:2,400; and the aluminium compound: the high-molecular dispersant was 1:55.

Example C-8

(Preparation of a Colorant Dispersion C-8)

C.I. Pigment Blue 15:3 (1.0 part), and acetone (99.0 parts) were mixed, heated to 40° C., and then thoroughly stirred into a homogeneous solution. The solution was added to a solution of the above high-molecular dispersant B (1.0 part) in acetone (99.0 parts), and after mixing, water (10.0 parts) was added. Subsequently, acetone was removed by a rotary evaporator to afford a colorant dispersion C-8. The concentration of acetone in the resultant colorant dispersion was analyzed by gas chromatography. Acetone was not detected, resulting in the conclusion that it did not remain in the colorant dispersion.

| <Preparation of an ink C-8> | |
|---|---|
| Colorant dispersion C-8 | 40.0 parts |
| Glycerine | 5.0 parts |
| Diethylene glycol | 10.0 parts |
| An aqueous solution of calcium chloride (0.2%) | 1.0 part |
| An aqueous solution of aluminium chloride (0.2%) | 1.0 part |
| Deionized water | 43.0 parts |

The above components were mixed and thoroughly stirred to afford the ink according to the present invention. Determination was conducted of a weight ratio of the calcium compound to the high-molecular dispersant and a molar ratio of the aluminium compound to the high-molecular dispersant in the obtained ink; it was found that the calcium compound: the high-molecular dispersant was 1:4,600; and the aluminium compound: the high-molecular dispersant was 1:6.

Example C-9

(Preparation of a Colorant Dispersion C-9)

C.I. Pigment Blue 15:6 (1.0 part), and acetone (99.0 parts) were mixed, heated to 40° C., and then thoroughly stirred into a homogeneous solution. The solution was added to a solution of the above high-molecular dispersant C (1.0 part) in acetone (99.0 parts), and after mixing, water (10.0 parts) was added. Subsequently, acetone was removed by a rotary evaporator to afford a colorant dispersion C-9. The concentration of acetone in the resultant colorant dispersion was analyzed by gas chromatography. Acetone was not detected, resulting in the conclusion that it did not remain in the colorant dispersion.

| <Preparation of an ink C-9> | |
|---|---|
| Colorant dispersion C-9 | 60.0 parts |
| Glycerine | 11.0 parts |
| Ethylene glycol | 9.0 parts |
| An aqueous solution of calcium chloride (0.02%) | 1.0 part |
| An aqueous solution of aluminium chloride (0.01%) | 0.2 part |
| Deionized water | 18.8 parts |

The above components were mixed and thoroughly stirred to afford the ink according to the present invention. Determination was of a weight ratio of the calcium compound to the high-molecular dispersant and a molar ratio of the aluminium compound to the high-molecular dispersant in the obtained ink; it was found that the calcium compound: the high-molecular dispersant was 1:69,000; and the aluminium compound: the high-molecular dispersant was 1:900.

Comparative Example C-1

(Preparation of a Colorant Dispersion C-10)

A colorant dispersion C-1 was obtained in a similar manner as in Example C-1 except that C.I. Pigment Blue 16 used in Example C-1 was used as a colorant and a styrene-maleic acid random copolymer (number average molecular weight: 10,000) was used as a high-molecular dispersant.

| <Preparation of an ink C-10> | |
|---|---|
| Colorant dispersion C-10 | 50.0 parts |
| Triethylene glycol | 10.0 parts |
| Tripropylene glycol | 10.0 parts |
| An aqueous solution of calcium chloride (0.2%) | 1.0 part |
| An aqueous solution of aluminium hydroxide (0.01%) | 1.0 part |
| Deionized water | 28.0 parts |

The above components were mixed and thoroughly stirred to afford a comparative ink.

Comparative Example C-2

(Preparation of a Colorant Dispersion C-11)

A colorant dispersion C-11 was obtained in a similar manner as in Example C-1 except that C.I. Pigment Blue 15:3 used in Example C-4 was used as a coolant and an n-butyl methacrylate-methacrylic acid block copolymer (number average molecular weight: 10,000) was used as a high-molecular dispersant.

| <Preparation of an ink C-11> | |
|---|---|
| Colorant dispersion C-11 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example C-3

(Preparation of a Colorant Dispersion C-12)

A colorant dispersion C-12 was obtained in a similar manner as in Example C-1 except that C.I. Pigment Blue 15:1 used in Example C-2 was used as a colorant and polyoxyethylene hexadecyl ether (HLB 12.9) was used as a dispersant.

| <Preparation of an ink C-12> | |
|---|---|
| Colorant dispersion C-12 | 50.0 parts |
| Triethylene glycol | 10.0 parts |
| Tripropylene glycol | 10.0 parts |
| Deionized water | 30.0 parts |

The above components were mixed and thoroughly stirred to afford a comparative ink.

Comparative Example C-4

| <Preparation of an ink C-13> | |
|---|---|
| C.I. Direct Blue 199 | 5.0 parts |
| Tripropylene glycol | 20.0 parts |
| Deionized water | 75.0 parts |

The above components were mixed and thoroughly stirred to afford a comparative ink.

(Ranking)

The inks shown in Table 4 were ranked in a similar manner and in accordance with similar ranking standards as the manner and the standards, respectively, in the case of the above-described yellow inks. As presented in Table 4, all the inks of the Examples gave better results in ejection stability, image quality and fastness than all the inks of the Comparative Examples.

TABLE 4

Ranking Results

| | Ranked characteristics | | | |
|---|---|---|---|---|
| | Ejection stability | Image quality | Light fastness | Water-proofness |
| Example C-1 | A | A | A | A |
| Example C-2 | A | A | A | A |
| Example C-3 | A | A | A | A |
| Example C-4 | A | A | A | A |
| Example C-5 | A | A | A | A |
| Example C-6 | A | A | A | A |
| Example C-7 | A | A | A | A |
| Example C-8 | B | A | A | A |
| Example C-9 | B | B | A | A |
| Comp. Ex. C-1 | D | D | B | B |
| Comp. Ex. C-2 | C | C | B | A |
| Comp. Ex. C-3 | D | D | B | B |
| Comp. Ex. C-4 | B | B | C | C |

INDUSTRIAL APPLICABILITY

As has been described above, the present invention can provide inks capable of stably recording images of high fastness and excellent quality over a long period even under any conditions, and can also provide an inkjet recording method, ink cartridges and inkjet recording systems all of which make it possible to record images of superb fastness and quality.

BRIEF DESCRIPTION OF THE DRAWINGS

FIG. 1 is a fragmentary vertical cross-sectional view of a recording head in one embodiment of the inkjet recording system according to the present invention.

FIG. 2 is a fragmentary transverse cross-sectional view of the recording head shown in FIG. 1.

FIG. 3 is a fragmentary external perspective view of a multiple-nozzle recording head formed of a multiplicity of recording heads as shown in FIG. 1.

FIG. 4 is a simplified perspective view illustrating one embodiment of the inkjet recording system according to the present invention.

FIG. 5 is a vertical cross-sectional view of one embodiment of the ink cartridge according to the present invention.

FIG. 6 is a perspective view of a recording unit usable in the inkjet recording system according to the present invention.

FIG. 7 is a simplified, fragmentary cross-sectional view of another recording head usable in the inkjet recording system according to the present invention.

DESCRIPTION OF NUMERICAL REFERENCES

13: A recording head
14: An ink channel (nozzle)
15: A heating element plate
16: A protective layer
17-1, 17-2: Electrodes
18: A heating resistor layer
19: A heat storage layer
20: A substrate
21: An ink 22: An ejection orifice (fine slit)
23: A meniscus
24: Ink droplets
25: A recording medium
26: Nozzles
27: A glass plate
28: A heating head
40: An ink bag, an ink reservoir
42: A rubber-made plug
44: A waste ink absorber
45: An ink cartridge
51: A paper feed section
52: A paper feed roller
53: Paper ejection rollers
61: A blade
62: A cap
63: An ink absorber pad
64: A service station
65: A recording head
66: A carriage
67: A guide rod
68: A motor
69: A drive belt
70: A recording unit
71: A recording head unit
72: A vent hole
80: An ink channel
81: An orifice plate
82: A vibration plate
83: A piezoelectric element
84: A substrate
85: An ejection orifice

The invention claimed is:

1. An inkjet recording ink comprising:
a high-molecular dispersant;
a water-insoluble colorant encapsulated with said high-molecular dispersant, said colorant being at least one colorant selected from the group consisting of C.I. Pigment Yellow 3, C.I. Pigment Yellow 74, C.I. Pigment Yellow 93, C.I. Pigment Yellow 95, C.I. Pigment Yellow 109, C.I. Pigment Yellow 120, C.I. Pigment Yellow 128, C.I. Pigment Yellow 138, C.I. Pigment Yellow 151, C.I. Pigment Yellow 175, C.I. Pigment Yellow 183, C.I. Pigment Yellow 184, C.I. Pigment Black 1, C.I. Pigment Black 7, C.I. Pigment Black 10, C.I. Pigment Black 31, C.I. Pigment Black 32, C.I. Pigment Red 12, C.I. Pigment Red 122, C.I. Pigment Red 184, C.I. Pigment Red 202, C.I. Pigment Violet 19, C.I. Pigment Violet 32, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, and C.I. Pigment Green 7;
a water-soluble organic solvent;
at least one compound selected from the group consisting of a calcium compound and a magnesium compound;
an aluminum compound; and
water,
wherein said high-molecular dispersant is a block copolymer comprising at least one hydrophobic block and at least one hydrophilic block, and said at least one hydrophobic block and at least one hydrophilic block have been obtained by polymerizing vinyl ethers as monomers, respectively, and a content of said aluminum compound in said ink is from 1:300 to 1:20 in terms of a molar ratio of said aluminum compound to said high-molecular dispersant,
wherein a weight percent of said at least one compound to said inkjet recording ink is in the range of from 0.00015 wt.% to 0.05 wt.%, and
wherein a weight percent of said aluminum compound to said inkjet recording ink is in the range of from 0.00002 wt.% to 0.002 wt.%.

2. An inkjet recording ink according to claim 1, wherein said aluminum compound is at least one of aluminum hydroxide and aluminum oxide.

3. An inkjet recording ink according to claim 1, wherein said at least one hydrophilic block in said high-molecular dispersant is formed of an anionic vinyl ether.

4. An inkjet recording ink according to claim 1, wherein said at least one hydrophilic block in said high-molecular dispersant is formed of a nonionic vinyl ether.

5. An inkjet recording ink according to claim 1, wherein said at least one hydrophilic block in said high-molecular dispersant is composed of at least two blocks consisting of a block formed of a nonionic vinyl ether and a block formed of an anionic vinyl ether.

6. An inkjet recording ink according to claim 1, wherein said high-molecular dispersant is composed of a block formed of one of hydrophobic vinyl ethers, a block formed of one of nonionic hydrophilic vinyl ethers and a block formed of one of anionic hydrophilic vinyl ethers at least in this order.

7. An inkjet recording method for recording on a recording medium, said recording method comprising:
applying energy to an ink to cause the ink to be dispersed onto the recording medium, wherein the ink is an ink as defined in claim 1.

8. An inkjet recording method according to claim 7, wherein the energy is thermal energy.

9. An inkjet recording method according to claim 7, wherein the recording medium has an ink-receiving coating layer on at least one of opposite sides thereof.

10. An ink cartridge comprising:
an ink reservoir with an ink stored therein, wherein the ink is an ink as defined in claim 1.

11. An inkjet recording system comprising:
an ink cartridge, which is provided with an ink reservoir with an ink stored therein; and
a recording head portion for ejecting the ink, wherein the ink is an ink as defined in claim 1.

* * * * *